US012784688B2

(12) United States Patent
Yuan et al.

(10) Patent No.: US 12,784,688 B2
(45) Date of Patent: Nov. 3, 2026

(54) DISPLAY PANEL, DISPLAY UNIT AND DRIVE METHOD THEREFOR

(71) Applicants: Hefei BOE Joint Technology Co., Ltd., Hefei City (CN); BOE TECHNOLOGY GROUP CO., LTD., Beijing (CN); Beijing BOE Technology Development Co., Ltd., Beijing (CN)

(72) Inventors: Can Yuan, Beijing (CN); Yongqian Li, Beijing (CN); Xinxin Wang, Beijing (CN); Xiang Wan, Beijing (CN); Zhidong Yuan, Beijing (CN); Liu Wu, Beijing (CN)

(73) Assignees: HEFEI BOE JOINT TECHNOLOGY CO., LTD., Hefei (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 19/472,114

(22) PCT Filed: Jun. 20, 2024

(86) PCT No.: PCT/CN2024/100412
§ 371 (c)(1),
(2) Date: Oct. 3, 2025

(87) PCT Pub. No.: WO2025/020789
PCT Pub. Date: Jan. 30, 2025

(65) Prior Publication Data
US 2026/0245517 A1 Aug. 20, 2026

(30) Foreign Application Priority Data
Jul. 27, 2023 (CN) ........................ 202310946505.6

(51) Int. Cl.
*G09G 3/3233* (2016.01)

(52) U.S. Cl.
CPC ... *G09G 3/3233* (2013.01); *G09G 2300/0465* (2013.01); *G09G 2300/0819* (2013.01);
(Continued)

(58) Field of Classification Search
CPC ...... G09G 3/3233; G09G 3/30; G09G 3/3208; G09G 2300/0804
See application file for complete search history.

(56) References Cited

U.S. PATENT DOCUMENTS 7,535,447 B2 * 5/2009 Kwak .................. G09G 3/3233 345/87
2016/0012774 A1 * 1/2016 Ohara .................. G09G 3/2025 345/694
2016/0189602 A1 6/2016 Yang

FOREIGN PATENT DOCUMENTS

CN 108320703 A 7/2018
CN 112634818 A 4/2021
CN 116959377 A 10/2023

OTHER PUBLICATIONS

International Search Report mailed on Aug. 20, 2024, received for PCT Application PCT/CN2024/100412, filed on Jun. 20, 2024, 4 pages including English Translation.
(Continued)

*Primary Examiner* — Koosha Sharifi-Tafreshi
(74) *Attorney, Agent, or Firm* — XSENSUS LLP

(57) ABSTRACT

The present disclosure relates to a display unit, including: a driving current module configured to output a driving current to a first node according to a data voltage; a composite path module, including a first path module and a second path module connected in series, and a second control circuit, wherein a terminal of the composite path module is electrically connected to the first node, and the other terminal is configured to load a reference power supply voltage, and the second control circuit is configured to control whether the
(Continued)

composite path module is electrically conductive; and a third path module, including a third light-emitting element and a fourth control circuit connected in series, wherein a terminal of the third path module is electrically connected to the first node, and the other terminal is configured to load the reference power supply voltage.

17 Claims, 9 Drawing Sheets

(52) U.S. Cl.
CPC . *G09G 2310/08* (2013.01); *G09G 2320/0214* (2013.01); *G09G 2330/021* (2013.01); *G09G 2340/0457* (2013.01)

(56) References Cited

OTHER PUBLICATIONS

Written Opinion mailed on Aug. 20, 2024, received for PCT Application PCT/CN2024/100412, filed on Jun. 20, 2024, 9 pages including English Translation.

* cited by examiner

DISPLAY PANEL, DISPLAY UNIT AND DRIVE METHOD THEREFOR

CROSS-REFERENCE TO RELATED APPLICATIONS

The present application is a U.S. National Stage Application of International Application No. PCT/CN2024/100412, filed on Jun. 20, 2024, which is based upon and claims the priority to the Chinese Patent Application NO. 202310946505.6, entitled "DISPLAY PANEL, DISPLAY UNIT AND DRIVING METHOD THEREOF", filed on Jul. 27, 2023, the entire contents of each are hereby incorporated by reference.

TECHNICAL FIELD

The present disclosure relates to the field of display technologies, and in particular, to a display panel, a display unit, and a driving method thereof.

BACKGROUND

In the field of OLED displays, a sub-pixel is driven by a pixel driving circuit, and individual sub-pixels are laid out on a pixel layer.

It should be noted that the information disclosed in the Background section above is only for enhancing the understanding of the background of the present disclosure, and thus may include information that does not constitute prior art known to those of ordinary skill in the art.

SUMMARY

According to a first aspect of the present disclosure, there is provided a display unit, and the display unit includes:

a driving current module configured to output a driving current to a first node according to a data voltage;

a composite path module, including a first path module and a second path module connected in series, and a second control circuit, wherein a terminal of the composite path module is electrically connected to the first node, and the other terminal is configured to load a reference power supply voltage; the first path module includes a first light-emitting element and a first control circuit connected in parallel with the first light-emitting element; the second path module includes a second light-emitting element and a third control circuit connected in parallel with the second light-emitting element; and the second control circuit is configured to control whether the composite path module is electrically conductive; and a third path module, including a third light-emitting element and a fourth control circuit connected in series, wherein a terminal of the third path module is electrically connected to the first node, and the other terminal is configured to load the reference power supply voltage.

According to a second aspect of the present disclosure, there is provided a display panel, including the display unit described above.

According to a third aspect of the present disclosure, there is provided a driving method for a display unit, which is applied to the display unit described above, wherein the driving method includes:

in a first phase, writing the data voltage of the first light-emitting element to the driving current module to make the composite path module electrically conductive and make the first control circuit, the third control circuit, and the fourth control circuit disconnected;

in a second phase, writing the data voltage of the second light-emitting element to the driving current module to make the composite path module electrically conductive, and make the third control circuit, the first control circuit, and the fourth control circuit disconnected; and in a third phase, writing the data voltage of the third light-emitting element to the driving current module to make the composite path module disconnected and make the fourth control circuit electrically conductive.

According to a fourth aspect of the present disclosure, there is provided a driving method for a display unit, which is applied to the display unit described above, wherein the driving method includes:

in a first sub-phase of a first phase, loading the second scanning signal and the initialization voltage to the sensing transistor; loading the third scanning signal and an active level of the first control signal to the second transistor to turn on the sixth transistor; loading the third scanning signal and an active level of the second control signal to the third transistor to turn on the seventh transistor; and loading the third scanning signal and an active level of the fourth control signal to the eleventh transistor to turn on the tenth transistor;

in a second sub-phase of the first phase, loading the first scanning signal and the data voltage of the first light-emitting element to the data writing transistor to write the data voltage of the first light-emitting element to the second node; loading the third scanning signal and an inactive level of the first control signal to the second transistor to turn off the sixth transistor; loading the third scanning signal and the active level of the third control signal to the ninth transistor to turn on the eighth transistor; and loading the third scanning signal and the inactive level of the fourth control signal to the eleventh transistor to turn off the tenth transistor;

in a third sub-phase of the first phase, not loading the first scanning signal to the data writing transistor to turn off the data writing transistor; not loading the second scanning signal to the sensing transistor to turn off the sensing transistor; and not loading the third scanning signal to the second transistor, the third transistor, the ninth transistor, and the eleventh transistor to turn off the second transistor, the third transistor, the ninth transistor, and the eleventh transistor;

in a first sub-phase of a second phase, loading the second scanning signal and the initialization voltage to the sensing transistor; loading the third scanning signal and the active level of the first control signal to the second transistor to turn on the sixth transistor; loading the third scanning signal and the active level of the second control signal to the third transistor to turn on the seventh transistor; and loading the third scanning signal and the active level of the fourth control signal to the eleventh transistor to turn on the tenth transistor;

in a second sub-phase of the second phase, loading the first scanning signal and the data voltage of the second light-emitting to the data writing transistor to write the data voltage of the second light-emitting element to the second node; loading the third scanning signal and the active level of the first control signal to the second transistor to turn on the sixth transistor; loading the third scanning signal and the active level of the second control signal to the third transistor to turn on the seventh transistor; loading the third scanning signal and the inactive level of the third control signal to the ninth transistor to turn off the eighth transistor; and loading the third scanning signal and the inactive level of the fourth control signal to the eleventh transistor to turn off the tenth transistor;

in a third sub-phase of the second phase, not loading the first scanning signal to the data writing transistor to turn off the data writing transistor; not loading the second scanning signal to the sensing transistor to turn off the sensing transistor; not loading the third scanning signal to the second transistor, the third transistor, the ninth transistor, and the eleventh transistor to turn off the second transistor, the third transistor, the ninth transistor, and the eleventh transistor;

in a first sub-phase of a third phase, loading the second scanning signal and the initialization voltage to the sensing transistor; loading the third scanning signal and the active level of the first control signal to turn on the sixth transistor; loading the third scanning signal and the active level of the second control signal to the third transistor to turn on the seventh transistor; and loading the third scanning signal and the active level of the fourth control signal to the eleventh transistor to turn on the tenth transistor;

in a second sub-phase of the third phase, loading the first scanning signal and the data voltage of the third light-emitting element to the data writing transistor to write the data voltage of the third light-emitting element to the second node; loading the third scanning signal and the inactive level of the second control signal to the third transistor to turn off the seventh transistor; loading the third scanning signal and the inactive level of the third control signal to the ninth transistor to turn off the eighth transistor; and loading the third scanning signal and the active level of the fourth control signal to the eleventh transistor to turn on the tenth transistor; and in a third sub-phase of the third phase, not loading the first scanning signal to the data writing transistor to turn off the data writing transistor; not loading the second scanning signal to the sensing transistor to turn off the sensing transistor; not loading the third scanning signal to the second transistor, the third transistor, the ninth transistor and the eleventh transistor to turn off the second transistor, the third transistor, the ninth transistor and the eleventh transistor.

It should be noted that the above general description and the following detailed description are merely exemplary and explanatory and should not be construed as limiting of the disclosure.

BRIEF DESCRIPTION OF THE DRAWINGS

The drawings herein are incorporated in and constitute a part of the specification, illustrate embodiments consistent with the present disclosure, and together with the description serve to explain principles of the present disclosure. Apparently, the drawings in the following description are only some embodiments of the present disclosure. For those of ordinary skill in the art, other drawings may be obtained based on these drawings without paying any creative effort.

DETAILED DESCRIPTION

Figure 1:
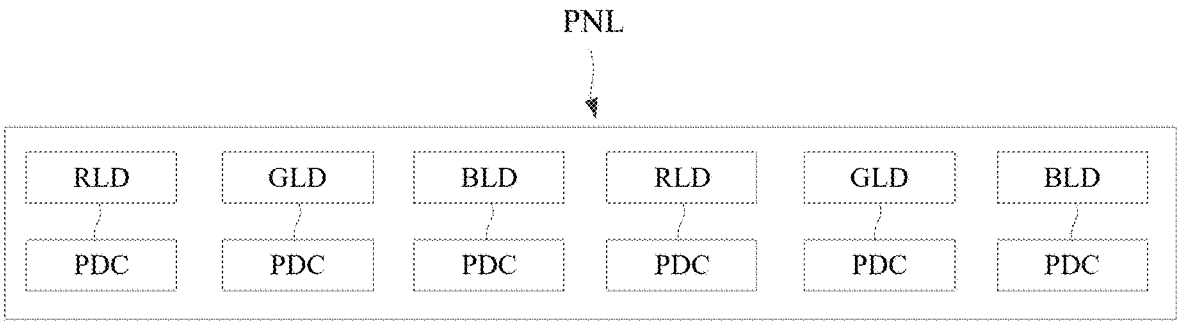
FIG. 1 is a schematic structural diagram of a display panel in the related arts.

Example embodiments will now be described more fully with reference to the accompanying drawings. However, the example embodiments can be implemented in a variety of forms and should not be construed as being limited to the embodiments set forth herein; rather, these embodiments are provided so that the present disclosure will be more complete and comprehensive so as to convey the idea of the example embodiments to those skilled in this art. The same reference numerals in the drawings denote the same or similar structures, and the repeated description thereof will be omitted. In addition, the drawings are merely schematic representations of the present disclosure and are not necessarily drawn to scale.

Although the relative terms such as “above” and “below” are used in the specification to describe the relative relationship of one component to another component shown, these terms are only for convenience in this specification, for example, according to an example direction shown in the drawings. It will be understood that if the device shown is flipped upside down, the component described as “above” will become a component “below” another component. When a structure is “on” another structure, it may mean that a structure is integrally formed on another structure, or that a structure is “directly” disposed on another structure, or that a structure is “indirectly” disposed on another structure through other structures.

The terms “one”, “a”, “the”, “said”, and “at least one” are used to indicate that there are one or more elements/components or the like; the terms “include” and “have” are used to indicate an open meaning of including and means that there may be additional elements/components/etc. in addition to the listed elements/components/etc.; the terms “first”, “second” and “third” etc. are used only as markers, and do not limit the number of objects.

A transistor refers to an element including at least three terminals, i.e., a gate, a drain, and a source. The transistor has a channel region between the drain (drain electrode terminal, drain region or drain electrode) and the source (source electrode terminal, source region or source electrode), and the current flows through the drain, the channel region and the source. The channel region refers to a region through which the current mainly flows. In embodiments of the present disclosure, the functions of "source" and "drain" are sometimes interchanged with each other when transistors with opposite polarities are used or when the direction of the current changes during circuit operation, that is, the "source" and "drain" can be interchanged. In embodiments of the present disclosure, for any transistor, one of the "source" and the "drain" is referred to as a first terminal of the transistor, and the other is referred to as a second terminal of the transistor.

FIG. 1 is a schematic structural diagram of a display panel PNL in the related arts. Referring to FIG. 1, the display panel PNL is provided with a first display unit, a second display unit and a third display unit. The first display unit includes a first light-emitting element RLD and a pixel driving circuit PDC that drives the first light-emitting element RLD. The second display unit includes a second light-emitting element GLD and a pixel driving circuit PDC that drives the second light-emitting element GLD. The third display unit includes a third light-emitting element BLD and a pixel driving circuit PDC that drives the third light-emitting element BLD. The first light-emitting element RLD, the second light-emitting element GLD, and the third light-emitting element BLD do not overlap with each other and emit light under the drive of their respective pixel driving circuits PDC. In an example, at least at certain time instances, the first light-emitting element RLD, the second light-emitting element GLD and the third light-emitting element BLD can emit light simultaneously.

Figure 2:
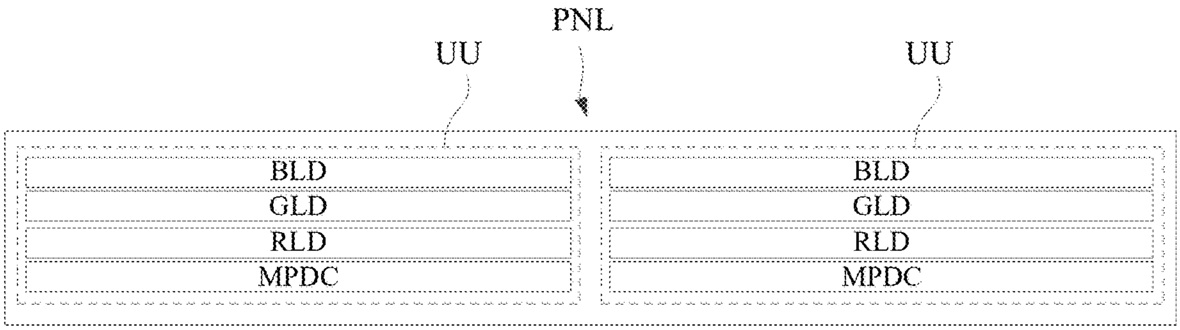
FIG. 2 is a schematic structural diagram of a display panel in an embodiment of the present disclosure.

An embodiment of the present disclosure provides another display panel PNL and its display units UU. Referring to FIG. 2, the display panel PNL includes display units UU arranged in an array, each of which includes a first light-emitting element RLD, a third light-emitting element BLD and a second light-emitting element GLD, as well as a composite driving circuit for driving the first light-emitting element RLD, the second light-emitting element GLD and the third light-emitting element BLD. In this embodiment, the composite driving circuit can implement time-division driving of the first light-emitting element RLD, the second light-emitting element GLD and the third light-emitting element BLD. That is, a single pixel driving circuit can drive three different light-emitting elements, rather than a single pixel driving circuit driving only one light-emitting element. Compared to providing three pixel driving circuits, the composite driving circuit of the embodiment of the present disclosure can reduce the number of electronic components (such as transistors and capacitors), thereby reducing the layout area of the pixel driving circuit and reducing the constraints imposed by the layout area of the pixel driving circuit on the resolution of the display panel PNL, that is, facilitating to improve the resolution of the display panel PNL.

In an example, referring to FIG. 2, in the display unit UU, the first light-emitting element RLD, the second light-emitting element GLD, and the third light-emitting element BLD can overlap with each other, rather than being laid out on the pixel layer without overlapping with each other. In this way, competition for space between the light-emitting elements can be reduced, allowing different light-emitting elements to reuse the same pixel opening to increase the light-emitting area of the single light-emitting element, which improves the aperture ratio of the display panel PNL. This increased aperture ratio of the display panel PNL can increase the light-emitting brightness of the display panel PNL and reduce power consumption of the display panel PNL. Furthermore, the increased light-emitting area of the light-emitting element can reduce the light-emitting brightness of the light-emitting element, thereby increasing the lifespan of the light-emitting element and extending the lifespan of the display panel PNL. Furthermore, in this example, by overlapping the first light-emitting element RLD, the second light-emitting element GLD and the third light-emitting element BLD, the aperture ratio of the display panel PNL can be significantly increased (e.g., by 300%), which allows the sub-pixels to have larger aperture sizes while maintaining ultra-high resolution of the display panel PNL, overcoming the constraints imposed by the light-emitting area of the sub-pixel on the resolution of the display panel PNL.

In an example, the display panel PNL may be an AR display panel, a VR display panel, a naked-eye 3D display panel, or other types of display panels, especially a display panel requiring high brightness and high resolution.

In some embodiments, the first light-emitting element RLD, the second light-emitting element GLD and the third light-emitting element BLD may be thin-film light-emitting elements, such as OLEDs, PLEDs, or QLEDs. In an example, the first light-emitting element RLD, the second light-emitting element GLD and the third light-emitting element BLD are OLEDs. In this example, the first light-emitting element RLD, the second light-emitting element GLD and the third light-emitting element BLD may have a larger light-emitting area by being at least partially stacked on top of each other, which can increase the lifespan of the OLED by reducing the luminance, thereby improving the problem of low OLED lifespan.

In some embodiments, the first light-emitting element RLD, the second light-emitting element GLD and the third light-emitting element BLD can be stacked on each other by means of the coordination of an upright setting and an inverted setting. In an embodiment of the present disclosure, the upright setting of the light-emitting element means that the light-emitting element emits light from a side of a common electrode, and the inverted setting of the light-emitting element means that the light-emitting element emits light from a side of a pixel electrode. Alternatively, the light-emitting element can also emit light from both sides. In an example, the third light-emitting element BLD is a blue light-emitting element, which can be in the inverted setting. This can make the light-emitting efficiency of the third light-emitting element BLD higher. In another example, the third light-emitting element BLD can be located on a side closest to the light-emitting side of the display panel PNL to improve the light-emitting efficiency of the third light-emitting element BLD.

In some embodiments, the first light-emitting element RLD, the second light-emitting element GLD, and the third light-emitting element BLD may be light-emitting elements of different colors. For example, the first light-emitting element RLD may be a red light-emitting element, the second light-emitting element GLD may be a green light-emitting element, and the third light-emitting element BLD may be a blue light-emitting element. Alternatively, at least one of the first light-emitting element RLD, the second light-emitting element GLD, and the third light-emitting element BLD may also be a light-emitting element of another color, such as a yellow light-emitting element, an orange light-emitting element, etc.

Figure 3:
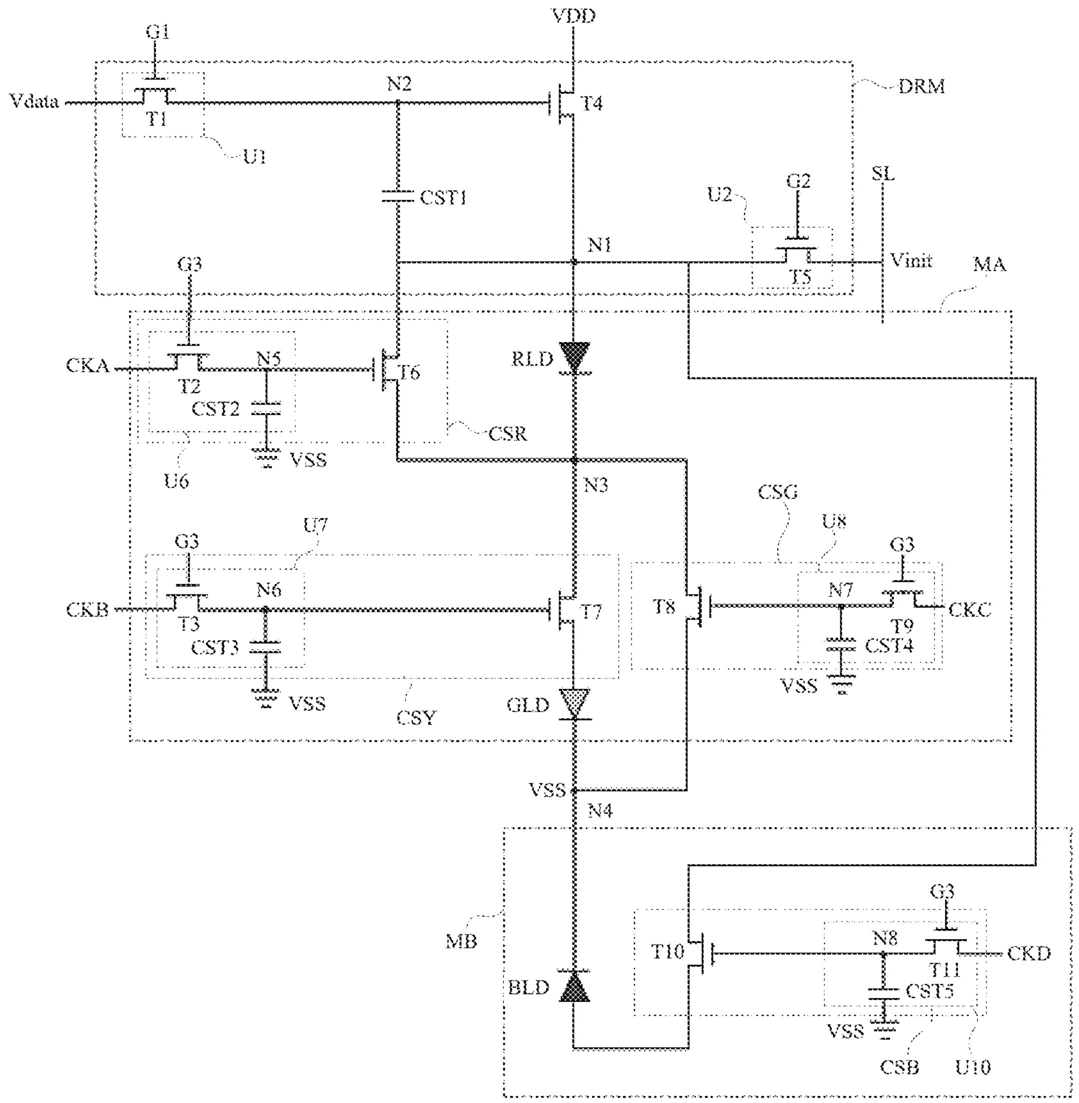
FIG. 3 is a schematic diagram of a principle of a display unit in an embodiment of the present disclosure.

In an embodiment of the present disclosure, referring to FIG. 3, the display unit UU includes:

- a driving current module DRM configured to output a driving current to a first node N1 according to a data voltage Vdata;

a composite path module MA, including a first path module and a second path module connected in series, and a second control circuit CSY; a terminal of the composite path module MA is electrically connected to the first node N1, and the other terminal is electrically connected to a fourth node N4, and the fourth node N4 is configured to load a reference power supply voltage VSS; the first path module includes a first light-emitting element RLD and a first control circuit CSR connected in parallel with the first light-emitting element RLD; the second path module includes a second light-emitting element GLD and a third control circuit CSG connected in parallel with the second light-emitting element GLD; and the second control circuit CSY is configured to control whether the composite path module MA is electrically conductive; and a third path module MB, including a third light emitting element BLD and a fourth control circuit CSB connected in series, a terminal of the third path module MB is electrically connected to the first node N1, and the other terminal is configured to load the reference power supply voltage VSS.

In this embodiment, the driving current module DRM, the first control circuit CSR, the third control circuit CSG, the fourth control circuit CSB and the second control circuit CSY together constitute the composite driving circuit of the display unit UU. This composite driving circuit can realize the time-division driving of the first light-emitting element RLD, the second light-emitting element GLD and the third light-emitting element BLD.

Figure 4:
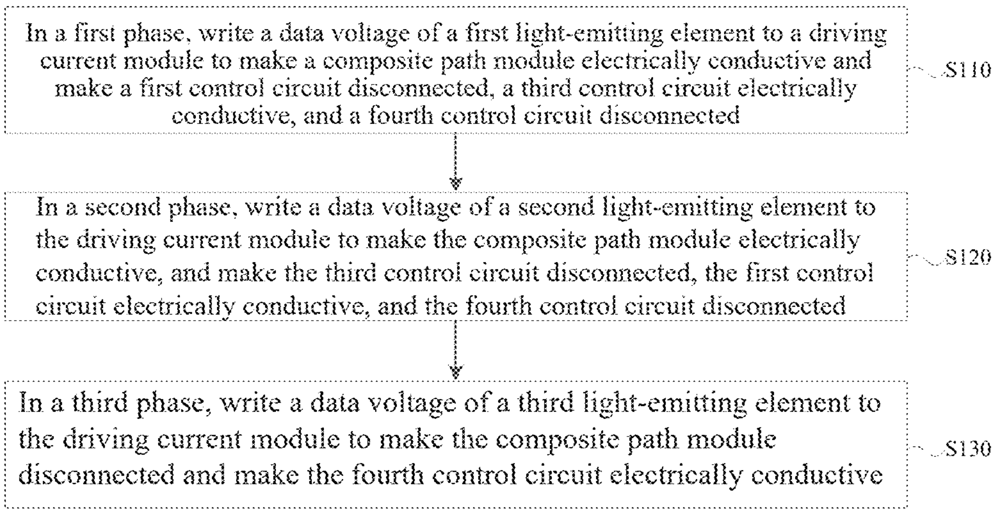
FIG. 4 is a schematic flowchart of a driving method for a display unit in an embodiment of the present disclosure.

Referring to FIG. 4, the display unit UU can be driven using the following driving method.

In step S110, in a first phase P1, a data voltage Vdata of the first light-emitting element RLD is written to the driving current module DRM, so that the composite path module MA is made electrically conductive, the first control circuit CSR is turned off, the third control circuit CSG is turned on, and the fourth control circuit CSB is turned off.

In step S120, in a second phase P2, a data voltage Vdata of the second light-emitting element GLD is written to the driving current module DRM, so that the composite path module MA is made electrically conductive, the third control circuit CSG is turned off, the first control circuit CSR is turned on, and the fourth control circuit CSB is turned off.

In step S130, in a third phase P3, a data voltage Vdata of the third light emitting element BLD is written to the driving current module DRM, so that the composite path module MA is turned off and the fourth control circuit CSB is turned on.

Thus, the display unit UU can make the first light emitting element RLD emit light in the first phase P1, make the second light emitting element GLD emit light in the second phase P2, and make the third light emitting element BLD emit light in the third phase P3, thereby realizing time-division driving of different light emitting elements.

In an embodiment of the present disclosure, referring to FIG. 3, the driving current module DRM includes:

a driving transistor T4, where a first terminal of the driving transistor T4 is configured to load a driving power supply voltage VDD, a second terminal of the driving transistor T4 is electrically connected to the first node N1, and a gate of the driving transistor T4 is electrically connected to a second node N2; and the driving transistor T4 is capable of outputting a driving current to the first node N1 under the control of a voltage on the second node N2;

a data writing unit U1, configured to write the data voltage Vdata to the second node N2 in response to a first scanning signal G1;

a first capacitor CST1, wherein a first terminal of the first capacitor CST1 is electrically connected to the second node N2, and a second terminal of the first capacitor CST1 is electrically connected to the first node N1; and a sensing unit U2, configured to load an initialization voltage Vinit to the first node N1 in response to a second scanning signal G2.

In this embodiment, when the first scanning signal G1 is loaded to the data writing unit U1, the data voltage Vdata can be written to the second node N2, so that the data voltage Vdata written to the second node N2 can control a magnitude of the driving current that the driving transistor T4 can output. It can be understood that only when one of the composite path module MA or the third path module MB is electrically conductive, or when the sensing unit U2 is electrically conductive, the driving transistor T4 can output the driving current in response to the voltage on the second node N2. When the driving transistor T4 is not electrically conductive, the driving transistor T4 cannot output the driving current. When the second scanning signal G2 is loaded to the sensing unit U2, the initialization voltage Vinit can be written to the first node N1, thereby resetting the first node N1. In an example, a voltage value of the initialization voltage Vinit is the same as a voltage value of the reference power supply voltage VSS.

In an example, referring to FIG. 3, the data writing unit U1 includes a data writing transistor T1. A first terminal of the data writing transistor T1 is configured to load the data voltage Vdata, a second terminal of the data writing transistor T1 is electrically connected to the second node N2, and a gate of the data writing transistor T1 is configured to load the first scanning signal G1. The sensing unit U2 includes a sensing transistor T5. A first terminal of the sensing transistor T5 is configured to load the initialization voltage Vinit, a second terminal of the sensing transistor T5 is electrically connected to the first node N1, and a gate of the sensing transistor T5 is configured to load the second scanning signal G2.

Figure 5:
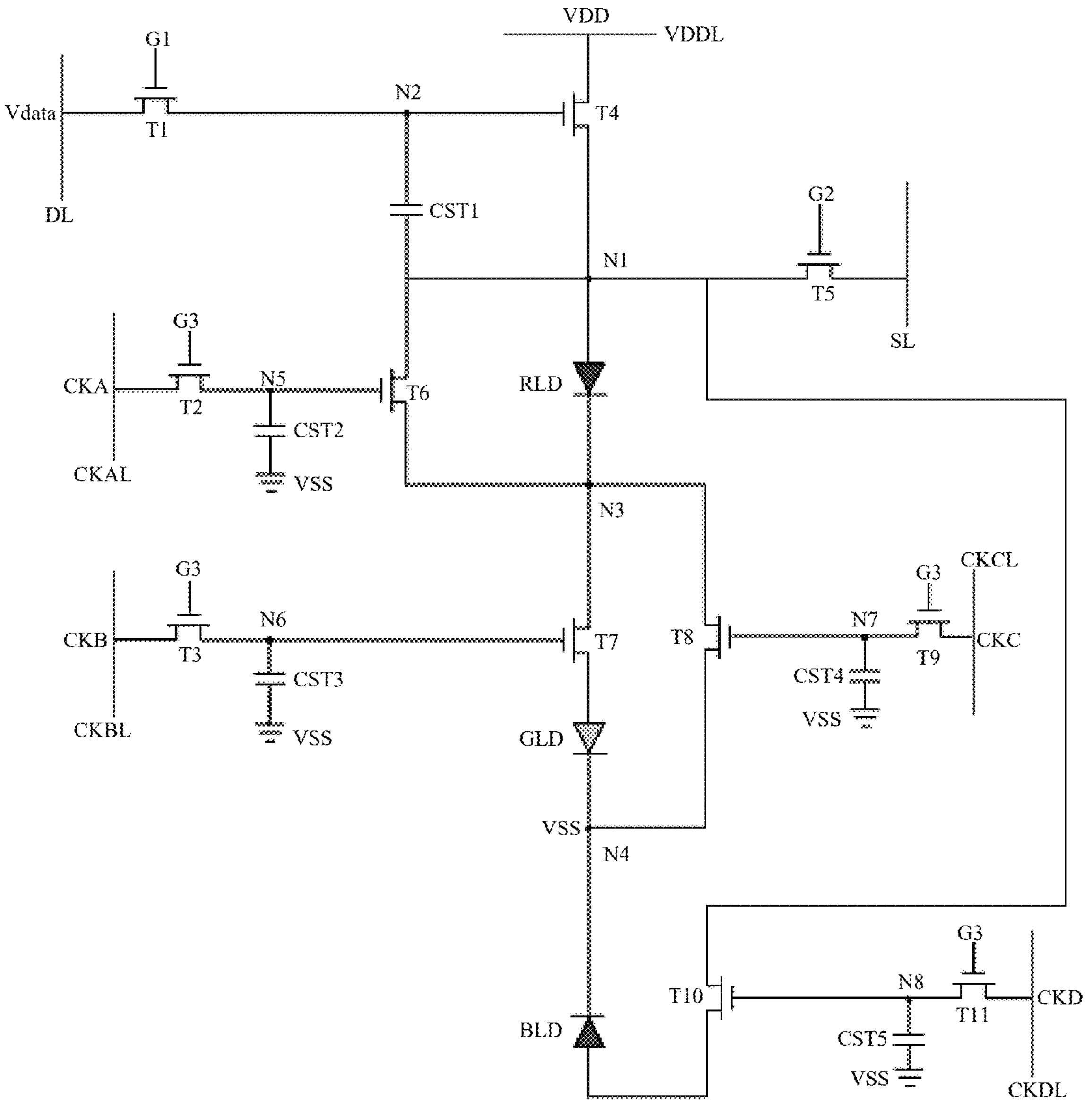
FIG. 5 is a schematic diagram of a principle of a display unit in an embodiment of the present disclosure.

In some embodiments, referring to FIG. 5, the display panel PNL is provided with a data line DL for loading the data voltage Vdata, a first scan line for loading the first scanning signal G1, a second scan line for loading the second scanning signal G2, and a sensing line SL for sensing. The first terminal of the data writing transistor T1 is electrically connected to the data line DL, and the gate of the data writing transistor T1 is electrically connected to the first scan line. The gate of the sensing transistor T5 is electrically connected to the second scan line, and the first terminal of the sensing transistor T5 is electrically connected to the sensing line SL. In this embodiment, in addition to transmitting the sensing signal to compensate the driving transistor T4, the sensing line SL can also be used to load the initialization voltage Vinit to the display unit UU to reset the display unit UU.

In this embodiment, the first scan line is configured to load the first scanning signal G1. It can be understood that the first scanning signal G1 can be a pulse signal having an active level of the first scanning signal G1 and an inactive level of the first scanning signal G1. Loading the first scanning signal G1 to the display unit UU means loading the active level of the first scanning signal G1 to the first scan line connected to the display unit UU. In other words, when it is necessary to turn on the data writing transistor T1, the active level of the first scanning signal G1 is loaded to the gate of the data writing transistor T1, and when it is not necessary to turn on the data writing transistor T1, the inactive level of the first scanning signal G1 is loaded to the gate of the data writing transistor T1.

In this embodiment, the second scan line is configured to load the second scanning signal G2. It can be understood that the second scanning signal G2 can be a pulse signal having an active level of the second scanning signal G2 and an inactive level of the second scanning signal G2. Loading the second scanning signal G2 to the display unit UU means loading the active level of the second scanning signal G2 to the second scan line connected to the display unit UU. In other words, when it is necessary to turn on the sensing transistor T5, the active level of the second scanning signal G2 is loaded to the gate of the sensing transistor T5, and when it is not necessary to turn on the sensing transistor T5, the inactive level of the second scanning signal G2 is loaded to the gate of the sensing transistor T5.

In an embodiment of the present disclosure, the driving current module DRM is a 3TIC circuit. It can be understood that in other embodiments of the present disclosure, the driving current module DRM may also adopt other circuits, such as a 7TIC circuit, an 8TIC circuit, etc.

In an embodiment of the present disclosure, referring to FIG. 3, the first control circuit CSR includes a sixth transistor T6 and a first control sub-circuit U6.

A first terminal of the sixth transistor T6 is connected to an anode of the first light-emitting element RLD, and a second terminal of the sixth transistor T6 is connected to a cathode of the first light-emitting element RLD. The sixth transistor T6 is configured to be turned on or off under the control of a voltage on a fifth node N5. The first control sub-circuit U6 is configured to control the voltage on the fifth node N5. When the first control circuit CSR is electrically conductive, specifically, when the sixth transistor T6 is turned on, the first light-emitting element RLD may be short-circuited, thereby making the first light-emitting element RLD not emit light. When the composite path module MA is electrically conductive and the sixth transistor T6 is turned off, the first light-emitting element RLD emits light.

In an example, the first control sub-circuit U6 includes a second transistor T2 and a second capacitor CST2. A first terminal of the second transistor T2 is configured to load a first control signal CKA, a second terminal of the second transistor T2 and a first terminal of the second capacitor CST2 are electrically connected to the fifth node N5, and a gate of the second transistor T2 is configured to load a third scanning signal G3. A second terminal of the second capacitor CST2 is configured to load the reference power supply voltage VSS. In this example, the first control signal CKA has an active level of the first control signal CKA and an inactive level of the first control signal CKA. The active level of the first control signal CKA can electrically turn on the sixth transistor T6, and the inactive level of the first control signal CKA can electrically turn off the sixth transistor T6.

In an example, referring to FIG. 5, the display panel PNL is provided with a first control line CKAL for loading the first control signal CKA, and the first control line CKAL is electrically connected to the first terminal of the second transistor T2. When the second transistor T2 is turned on in response to the third scanning signal G3 and the first control line CKAL loads the active level of the first control signal CKA, the active level of the first control signal CKA can be written to the fifth node N5 to turn on the sixth transistor T6. After the second transistor T2 is turned off, the active level of the first control signal CKA can be maintained by the second capacitor CST2, thereby maintaining the sixth transistor T6 in an on state. Correspondingly, when the second transistor T2 is turned on in response to the third scanning signal G3 and the first control line CKAL loads the inactive level of the first control signal CKA, the inactive level of the first control signal CKA can be written to the fifth node N5 to turn off the sixth transistor T6. After the second transistor T2 is turned off, the inactive level of the first control signal CKA can be maintained by the second capacitor CST2, thereby maintaining the sixth transistor T6 in an off state.

In this embodiment, the third scanning signal G3 is a pulse signal that can have an active level of the third scanning signal G3 and an inactive level of the third scanning signal G3. Loading the third scanning signal G3 to the display unit UU means loading the active level of the third scanning signal G3 to the display unit UU. For example, the active level of the third scanning signal G3 can be loaded to the second transistor T2 to turn on the second transistor T2, and the inactive level of the third scanning signal G3 can be loaded to the second transistor T2 to turn off the second transistor T2. In some embodiments, the display panel PNL is provided with a third scan line for loading the third scanning signal G3, and the gate of the second transistor T2 is electrically connected to the third scan line.

In an embodiment of the present disclosure, referring to FIG. 3, the third control circuit CSG includes an eighth transistor T8 and a third control sub-circuit U8. A second terminal of the eighth transistor T8 is electrically connected to a cathode of the second light-emitting element GLD. A first terminal of the eighth transistor T8 is electrically connected to an anode of the second light-emitting element GLD, or the first terminal of the eighth transistor T8 is electrically connected to the anode of the second light-emitting element GLD via the second control circuit CSY. The eighth transistor T8 is configured to be turned on or off under the control of a voltage on a seventh node N7, and the third control sub-circuit U8 is configured to control the voltage on the seventh node N7.

When the third control circuit CSG is electrically conductive, specifically, when the eighth transistor T8 is turned on, the second light emitting element GLD can be short-circuited, thereby making the second light emitting element GLD not emit light. When the composite path module MA is electrically conductive and the eighth transistor T8 is turned off, the second light emitting element GLD emits light.

In an example, the third control sub-circuit U8 includes a ninth transistor T9 and a fourth capacitor CST4. A first terminal of the ninth transistor T9 is configured to load a third control signal CKC, a second terminal of the ninth transistor T9 and a first terminal of the fourth capacitor CST4 are electrically connected to the seventh node N7, and a gate of the ninth transistor T9 is configured to load the third scanning signal G3. A second terminal of the fourth capacitor CST4 is configured to load the reference power supply voltage VSS. In this example, the third control signal CKC has an active level of the third control signal CKC and an inactive level of the third control signal CKC. The active level of the third control signal CKC can electrically turn on the eighth transistor T8, and the inactive level of the third control signal CKC can electrically turn off the eighth transistor T8.

In an example, referring to FIG. 5, the display panel PNL is provided with a third control line CKCL for loading the third control signal CKC, and the third control line CKCL is electrically connected to the first terminal of the ninth transistor T9. When the ninth transistor T9 is turned on in response to the third scanning signal G3 and the third control line CKCL loads the active level of the third control signal CKC, the active level of the third control signal CKC can be written to the seventh node N7 to turn on the eighth transistor T8. After the ninth transistor T9 is turned off, the active level of the third control signal CKC can be maintained by the fourth capacitor CST4, thereby maintaining the eighth transistor T8 in the on state. Correspondingly, when the ninth transistor T9 is turned on in response to the third scanning signal G3 and the third control line CKCL loads the inactive level of the third control signal CKC, the inactive level of the third control signal CKC can be written to the seventh node N7 to turn off the eighth transistor T8. After the ninth transistor T9 is turned off, the inactive level of the third control signal CKC can be maintained by the fourth capacitor CST4, thereby maintaining the eighth transistor T8 in the off state.

In this embodiment, the active level of the third scanning signal G3 may be loaded to the ninth transistor T9 to turn on the ninth transistor T9, and the inactive level of the third scanning signal G3 may be loaded to the ninth transistor T9 to turn off the ninth transistor T9. In some embodiments, the display panel PNL is provided with the third scan line for loading the third scanning signal G3, and the gate of the ninth transistor T9 is electrically connected to the third scan line.

Figure 11:
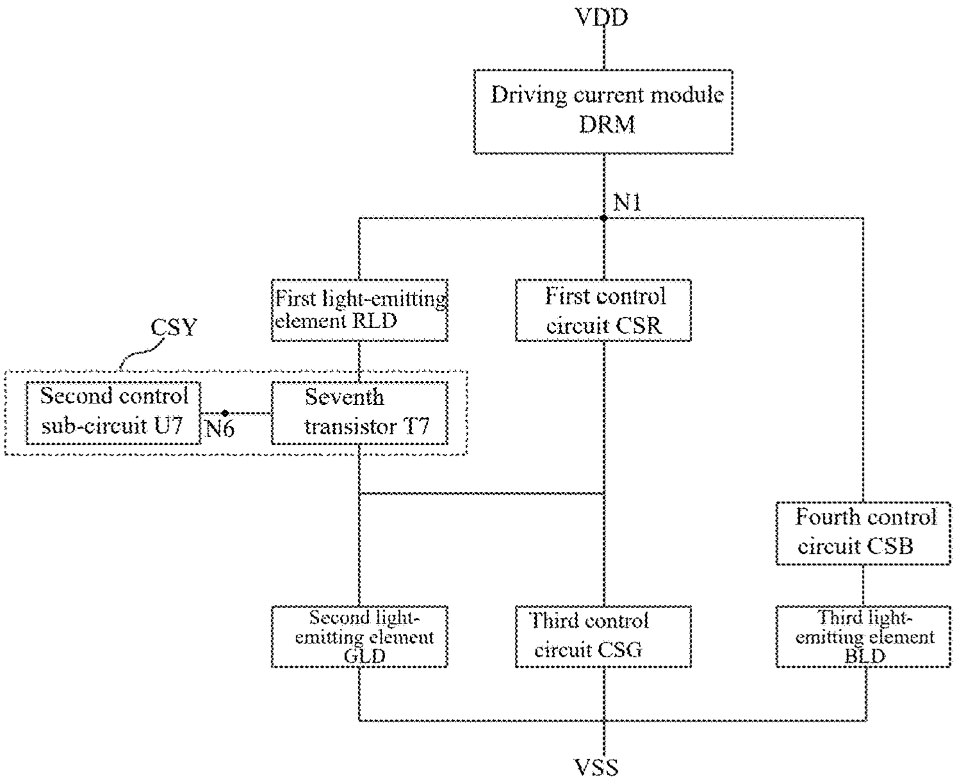
FIG. 11 is a schematic diagram of a principle of a display unit in another embodiment of the present disclosure.
Figure 12:
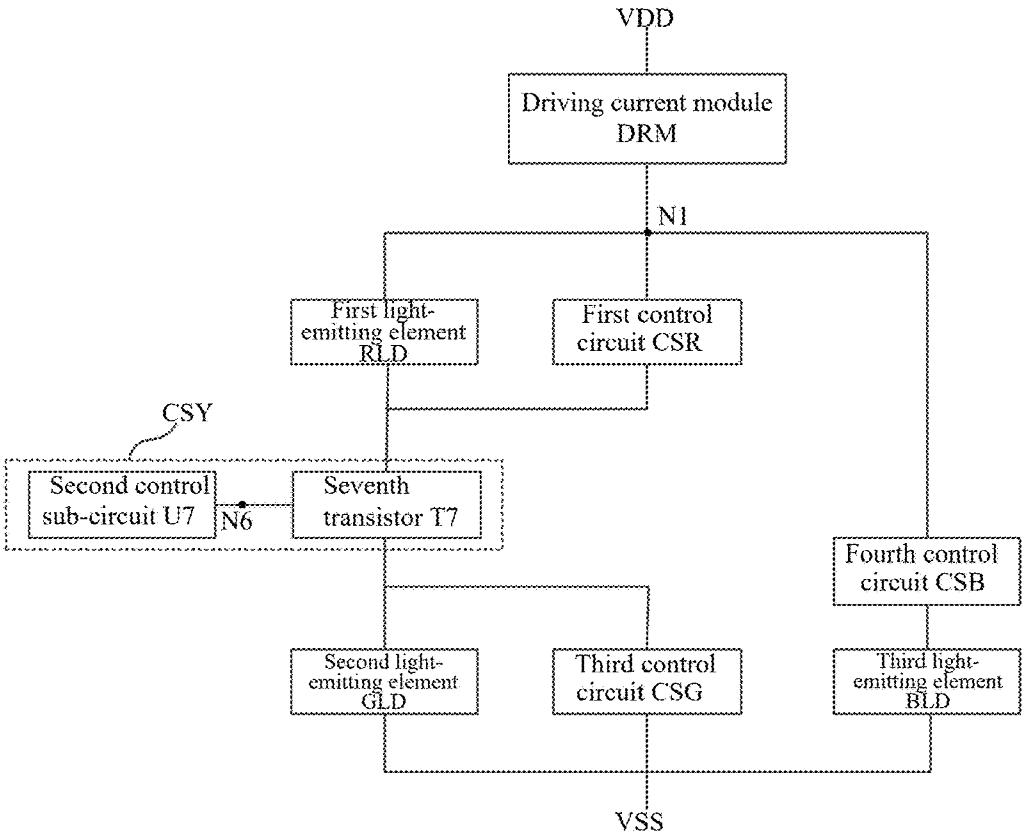
FIG. 12 is a schematic diagram of a principle of a display unit in yet another embodiment of the present disclosure.

In an embodiment of the present disclosure, referring to FIGS. 3, 11, and 12, the second control circuit CSY includes a seventh transistor T7 and a second control sub-circuit U7. The seventh transistor T7 is connected in series with the first light-emitting element RLD and in parallel with the first control circuit CSR (as shown in FIG. 11), or the seventh transistor T7 is connected in series with the first and second path modules (as shown in FIG. 12), or the seventh transistor T7 is connected in series with the second light-emitting element GLD and in parallel with the third control circuit CSG (as shown in FIG. 3). The seventh transistor T7 is configured to be turned on or off under the control of a voltage on a sixth node N6. The second control sub-circuit U7 is configured to control the voltage on the sixth node N6.

Referring to FIG. 11, when the seventh transistor T7 is connected in series with the first light-emitting element RLD and in parallel with the first control circuit CSR, the composite path module MA can be electrically disconnected by simultaneously disconnecting the second control circuit CSY and the first control circuit CSR. Specifically, the composite path module MA can be electrically disconnected by simultaneously turning off the sixth transistor T6 and the seventh transistor T7. Correspondingly, turning on either the sixth transistor T6 or the seventh transistor T7 can make the composite path module MA electrically conductive.

Referring to FIG. 12, when the seventh transistor T7 is connected in series with the first and second path modules, the composite path module MA can be electrically disconnected when the seventh transistor T7 is turned off. Correspondingly, when the seventh transistor T7 is turned on, the composite path module MA is electrically conductive.

Referring to FIG. 3, when the seventh transistor T7 is connected in series with the second light-emitting element GLD and in parallel with the third control circuit CSG, the composite path module MA can be electrically disconnected by simultaneously disconnecting the second control circuit CSY and the third control circuit CSG. Specifically, the composite path module MA can be electrically disconnected by simultaneously turning off the seventh transistor T7 and the eighth transistor T8. Correspondingly, the composite path module MA can be electrically conductive by turning on either the eighth transistor T8 or the seventh transistor T7.

In an embodiment of the present disclosure, the second control sub-circuit U7 includes a third transistor T3 and a third capacitor CST3. A first terminal of the third transistor T3 is configured to load a second control signal CKB, a second terminal of the third transistor T3 and a first terminal of the third capacitor CST3 are electrically connected to the sixth node N6, and a gate of the third transistor T3 is configured to load the third scanning signal G3. A second terminal of the third capacitor CST3 is configured to load the reference power supply voltage VSS.

In this example, the second control signal CKB has an active level of the second control signal CKB and an inactive level of the second control signal CKB. The active level of the second control signal CKB can electrically turn on the seventh transistor T7, and the inactive level of the second control signal CKB can electrically turn off the seventh transistor T7.

In an example, referring to FIG. 5, the display panel PNL is provided with a second control line CKBL for loading the second control signal CKB, and the second control line CKBL is electrically connected to the first terminal of the third transistor T3. When the third transistor T3 is turned on in response to the third scanning signal G3 and the second control line CKBL loads the active level of the second control signal CKB, the active level of the second control signal CKB can be written to the sixth node N6 to turn on the seventh transistor T7. After the third transistor T3 is turned off, the active level of the second control signal CKB can be maintained by the third capacitor CST3, thereby maintaining the seventh transistor T7 in the on state. Correspondingly, when the third transistor T3 is turned on in response to the third scanning signal G3 and the second control line CKBL loads the inactive level of the second control signal CKB, the inactive level of the second control signal CKB can be written to the sixth node N6 to turn off the seventh transistor T7. After the third transistor T3 is turned off, the inactive level of the second control signal CKB can be maintained by the third capacitor CST3, thereby maintaining the seventh transistor T7 in the off state.

In this embodiment, the third transistor T3 may be turned on by loading the active level of the third scanning signal G3 to the third transistor T3, and turned off by loading the inactive level of the third scanning signal G3 to the third transistor T3. In some embodiments, the display panel PNL is provided with the third scan line for loading the third scanning signal G3, and the gate of the third transistor T3 is electrically connected to the third scan line.

As an example, the anode of the first light-emitting element RLD and a terminal of the first control circuit CSR are electrically connected to the first node N1, and the cathode of the first light-emitting element RLD and the other terminal of the first control circuit CSR are electrically connected to the third node N3. Specifically, the anode of the first light-emitting element RLD and the first terminal of the sixth transistor T6 are electrically connected to the first node N1, and the cathode of the first light-emitting element RLD and the second terminal of the sixth transistor T6 are electrically connected to the third node N3. The cathode of the second light-emitting element GLD and a terminal of the third control circuit CSG (for example, the second terminal of the eighth transistor T8) are configured to load the reference power supply voltage VSS. The anode of the second light-emitting element GLD is electrically connected to the second terminal of the seventh transistor T7, and the first terminal of the seventh transistor T7 and the other terminal of the third control circuit CSG (the first terminal of the eighth transistor T8) are electrically connected to the third node N3.

In an embodiment of the present disclosure, referring to FIG. 3, the fourth control circuit CSB includes a tenth transistor T10 and a fourth control sub-circuit U10. A first terminal of the tenth transistor T10 is electrically connected to the first node N1, a second terminal of the tenth transistor T10 is electrically connected to an anode of the third light-emitting element BLD, and a cathode of the third light-emitting element BLD is configured to load the reference power supply voltage VSS. A gate of the tenth transistor T10 is electrically connected to an eighth node N8 and is configured to be turned on or off under the control of a voltage on the eighth node N8. The fourth control sub-circuit U10 is configured to control the voltage on the eighth node N8. When the fourth control circuit CSB is electrically conductive, specifically, when the tenth transistor T10 is turned on, the third path module MB is electrically conductive, thereby enabling the third light-emitting element BLD to emit light.

In an example, the fourth control sub-circuit U10 includes an eleventh transistor T11 and a fifth capacitor CST5. A first terminal of the eleventh transistor T11 is configured to load a fourth control signal CKD, a second terminal of the eleventh transistor T11 and a first terminal of the fifth capacitor CST5 are electrically connected to the eighth node N8, a gate of the eleventh transistor T11 is configured to load the third scanning signal G3, and a second terminal of the fifth capacitor CST5 is configured to load the reference power supply voltage VSS. In this example, the fourth control signal CKD has an active level of the fourth control signal CKD and an inactive level of the fourth control signal CKD. The active level of the fourth control signal CKD can electrically turn on the tenth transistor T10, and the inactive level of the fourth control signal CKD can electrically turn off the tenth transistor T10.

In an example, referring to FIG. 5, the display panel PNL is provided with a fourth control line CKDL for loading the fourth control signal CKD, and the fourth control line CKDL is electrically connected to the first terminal of the eleventh transistor T11. When the eleventh transistor T11 is turned on in response to the third scanning signal G3 and the fourth control line CKDL loads the active level of the fourth control signal CKD, the active level of the fourth control signal CKD can be written to the eighth node N8 to turn on the tenth transistor T10. After the eleventh transistor T11 is turned off, the active level of the fourth control signal CKD can be maintained by the fifth capacitor CST5, thereby maintaining the tenth transistor T10 in the on state. Correspondingly, when the eleventh transistor T11 is turned on in response to the third scanning signal G3 and the fourth control line CKDL loads the inactive level of the fourth control signal CKD, the inactive level of the fourth control signal CKD can be written to the eighth node N8 to turn off the tenth transistor T10. After the eleventh transistor T11 is turned off, the inactive level of the fourth control signal CKD can be maintained by the fifth capacitor CST5, thereby maintaining the tenth transistor T10 in the off state.

In this embodiment, the eleventh transistor T11 may be turned on by loading the active level of the third scanning signal G3 to the eleventh transistor T11, and turned off by loading the inactive level of the third scanning signal G3 to the eleventh transistor T11. In some embodiments, the display panel PNL is provided with the third scan line for loading the third scanning signal G3, and the gate of the eleventh transistor T11 is electrically connected to the third scan line.

In the following, the driving method and driving principle of the display unit UU are further explained and illustrated by taking the circuit structure of the display unit UU illustrated in FIGS. 3 and 5 as an example.

In this example, the driving current module DRM includes the data writing transistor T1, the driving transistor T4, the sensing transistor T5 and the first capacitor CST1. The data writing transistor T1 is configured to load the data voltage Vdata to the second node N2 in response to the first scanning signal G1. The sensing transistor T5 is configured to load the initialization voltage Vinit to the first node N1 in response to the second scanning signal G2. The first terminal of the first capacitor CST1 is electrically connected to the second node N2, and the other terminal is electrically connected to the first node N1. The first terminal of the driving transistor T4 is configured to load the driving power supply voltage VDD, the gate of the driving transistor T4 is electrically connected to the second node N2, and the second terminal of the driving transistor T4 is electrically connected to the first node N1. The driving transistor T4 is configured to output the driving current to the first node N1 under the control of the voltage of the second node N2.

In this example, the first control circuit CSR includes the sixth transistor T6, the second transistor T2, and the second capacitor CST2. The first terminal of the sixth transistor T6 and the anode of the first light-emitting element RLD are electrically connected to the first node N1, the second terminal of the sixth transistor T6 and the cathode of the first light-emitting element RLD are electrically connected to the third node N3, and the gate of the sixth transistor T6, the second terminal of the second transistor T2, and a terminal of the second capacitor CST2 are electrically connected to the fifth node N5. The second transistor T2 is configured to load the first control signal CKA to the fifth node N5 in response to the third scanning signal G3, and the other terminal of the second capacitor CST2 is configured to load the reference power supply voltage VSS.

In this example, the second control circuit CSY includes the seventh transistor T7, the third transistor T3 and the third capacitor CST3. The first terminal of the seventh transistor T7 is electrically connected to the third node N3, the second terminal of the seventh transistor T7 is electrically connected to the anode of the second light-emitting element GLD, and the gate of the seventh transistor T7, the second terminal of the third transistor T3 and a terminal of the third capacitor CST3 are electrically connected to the sixth node N6. The third transistor T3 is configured to load the second control signal CKB to the sixth node N6 in response to the third scanning signal G3, and the other terminal of the third capacitor CST3 is configured to load the reference power supply voltage VSS.

In this example, the third control circuit CSG includes the eighth transistor T8, the ninth transistor T9 and the fourth capacitor CST4. The first terminal of the eighth transistor T8 is electrically connected to the third node N3, the second terminal of the eighth transistor T8 and the cathode of the second light-emitting element GLD are configured to load the reference power supply voltage VSS, and the gate of the eighth transistor T8, the second terminal of the ninth transistor T9 and a terminal of the fourth capacitor CST4 are electrically connected to the seventh node N7. The ninth transistor T9 is configured to load the third control signal CKC to the seventh node N7 in response to the third scanning signal G3, and the other terminal of the fourth capacitor CST4 is configured to load the reference power supply voltage VSS.

In this example, the fourth control circuit CSB includes the tenth transistor T10, the eleventh transistor T11 and the fifth capacitor CST5. The first terminal of the tenth transistor T10 is electrically connected to the first node N1, the second terminal of the tenth transistor T10 is electrically connected to the anode of the third light-emitting element BLD, and the gate of the tenth transistor T10, the second terminal of the eleventh transistor T11 and the first terminal of the fifth capacitor CST5 are electrically connected to the eighth node N8. The eleventh transistor T11 is configured to load the fourth control signal CKD to the eighth node N8 in response to the third scanning signal G3, and the fifth capacitor CST5 is configured to load the reference power supply voltage VSS.

Figure 6:
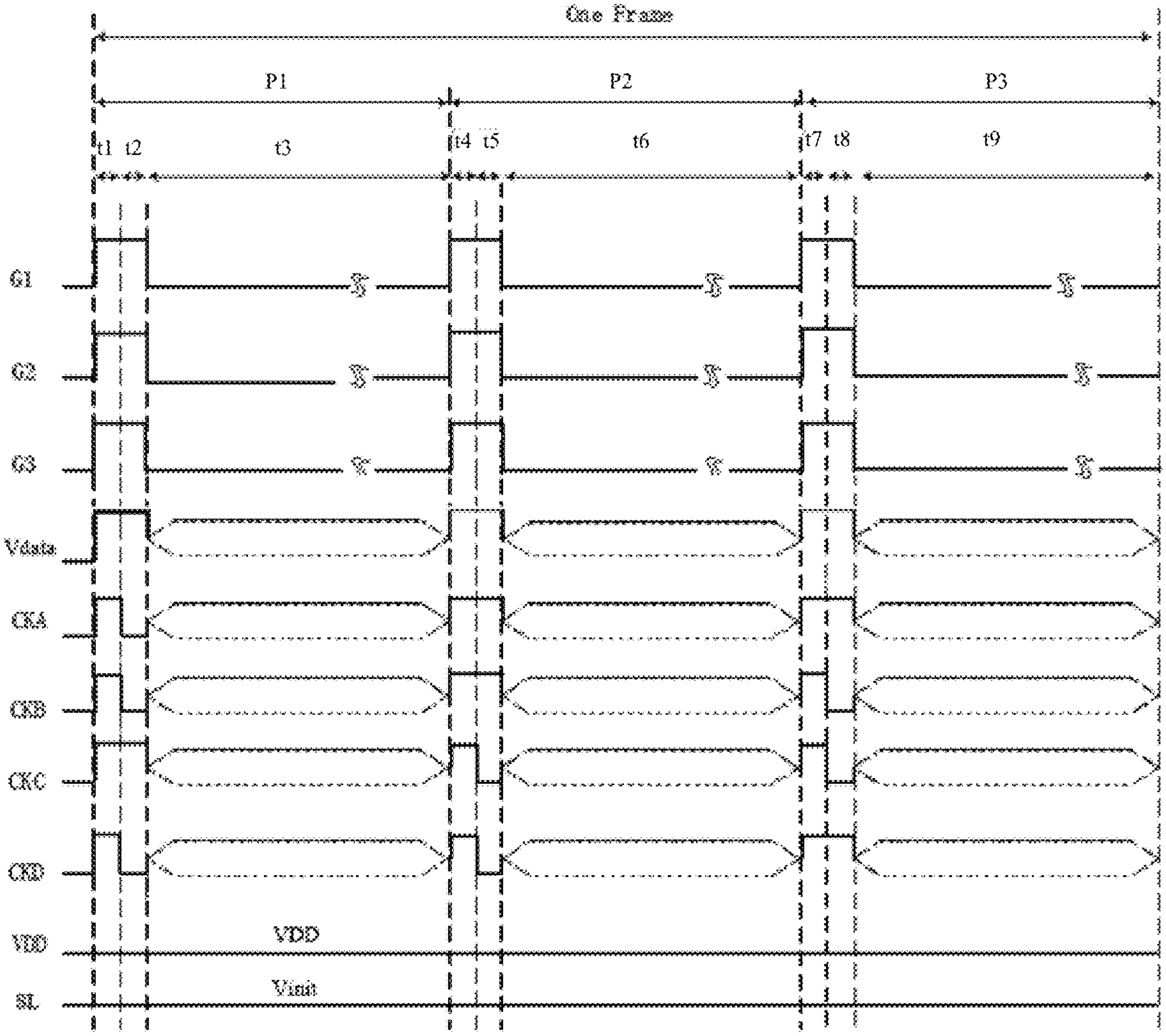
FIG. 6 is a schematic diagram of a driving timing sequence for a display unit in an embodiment of the present disclosure.

FIG. 6 illustrates the timing of various signals in a driving method for the display unit UU in the above example. In the example of FIG. 6, the active level of each signal is a high level, and the inactive level of each signal is a low level. It can be understood that in other embodiments of the present disclosure, the active level of any signal may also be a low level, and the corresponding inactive level may be a high level.

In a first sub-phase t1 of a first phase P1

The second scanning signal G2 (i.e., the active level of the second scanning signal G2) is loaded to the sensing transistor T5 and the initialization voltage Vinit is loaded to the sensing line SL. A voltage value of the initialization voltage Vinit is equal to a voltage value of the reference power supply voltage VSS. The sensing transistor T5 is turned on in response to the second scanning signal G2, and the voltage of the first node N1 is the initialization voltage Vinit, thereby resetting the first node N1 and the anode of the first light-emitting element RLD.

The third scanning signal G3 (i.e., the active level of the third scanning signal G3) is loaded to the second transistor T2, and the active level of the first control signal CKA is loaded to the first control line CKAL. The second transistor T2 is turned on in response to the third scanning signal G3, so that the voltage of the fifth node N5 is the active level of the first control signal CKA, which turns on the sixth transistor T6, thereby causing the voltage of the third node N3 to be the initialization voltage Vinit, so as to reset the third node N3.

The third scanning signal G3 (i.e., the active level of the third scanning signal G3) is loaded to the third transistor T3, and the active level of the second control signal CKB is loaded to the second control line CKBL. The third transistor T3 is turned on in response to the third scanning signal G3, so that the voltage of the sixth node N6 is the active level of the second control signal CKB, which turns on the seventh transistor T7, thereby causing the voltage of the anode of the second light-emitting element GLD to be the initialization voltage Vinit, so as to reset the anode of the second light-emitting element GLD.

The third scanning signal G3 (i.e., the active level of the third scanning signal G3) is loaded to the eleventh transistor T11, and the active level of the fourth control signal CKD is loaded to the fourth control line CKDL. The eleventh transistor T11 is turned on in response to the third scanning signal G3, so that the voltage of the eighth node N8 is the active level of the fourth control signal CKD, which turns on the tenth transistor T10, thereby causing the voltage of the anode of the third light-emitting element BLD to be the initialization voltage Vinit, so as to reset the anode of the third light-emitting element BLD.

Thus, in the first sub-phase t1 of the first phase P1, the anodes of the first light-emitting element RLD, the second light-emitting element GLD, and the third light-emitting element BLD can be reset.

Referring to FIG. 6, in the first sub-phase t1 of the first phase P1 of this example, the first scanning signal G1 (i.e., the active level of the first scanning signal G1) may be loaded to the data writing transistor T1, and the data voltage Vdata of the first light-emitting element RLD may be loaded to the data line DL. The data writing transistor T1 is turned on in response to the first scanning signal G1, and the data voltage Vdata of the first light-emitting element RLD is written to the second node N2. It can be understood that the data voltage Vdata of the first light-emitting element RLD may also not be written to the second node N2 during this phase.

Referring to FIG. 6, in the first sub-phase t1 of the first phase P1 of this example, the third scanning signal G3 (i.e., the active level of the third scanning signal G3) may be loaded to the ninth transistor T9, and the active level of the third control signal CKC may be loaded to the third control line CKCL. The ninth transistor T9 is turned on in response to the third scanning signal G3, so that the voltage of the seventh node N7 is the active level of the third control signal CKC, thereby turning on the eighth transistor T8. It can be understood that, in this phase, the third scanning signal G3 may also not be loaded to the ninth transistor T9, or the active level of the third control signal CKC may also not be loaded to the third control line CKCL.

In a second sub-phase t2 of the first phase P1

The first scanning signal G1 (i.e., the active level of the first scanning signal G1) is loaded to the data writing transistor T1 and the data voltage Vdata of the first light-emitting element RLD is loaded to the data line DL. The data writing transistor T1 is turned on in response to the first scanning signal G1, and the data voltage Vdata of the first light-emitting element RLD is written to the second node N2.

The third scanning signal G3 (i.e., the active level of the third scanning signal G3) is loaded to the second transistor T2 and the inactive level of the first control signal CKA is loaded to the first control line CKAL. The voltage of the fifth node N5 is the inactive level of the first control signal CKA, which turns off the sixth transistor T6.

The third scanning signal G3 (i.e., the active level of the third scanning signal G3) is loaded to the ninth transistor T9 and the active level of the third control signal CKC is loaded to the third control line CKCL. The voltage of the seventh node N7 is the active level of the third control signal CKC, which turns on the eighth transistor T8.

The third scanning signal G3 (i.e., the active level of the third scanning signal G3) is loaded to the eleventh transistor T11 and the inactive level of the fourth control signal CKD is loaded to the fourth control line CKDL. The voltage of the eighth node N8 is the inactive level of the fourth control signal CKD, which turns off the tenth transistor T10.

Thus, the sixth transistor T6 is turned off and the eighth transistor T8 is turned on, which causes the composite path module MA to be conductive. When a driving current flows through the composite path module MA, the driving current flows through the first light-emitting element RLD. The tenth transistor T10 is turned off to disconnect the third path module MB.

Referring to FIG. 6, in the second sub-phase t2 of the first phase P1 of this example, the initialization voltage Vinit may be loaded to the sensing line SL, and the second scanning signal G2 may be loaded to the sensing transistor T5, so that the driving current output by the driving transistor T4 under the control of the voltage on the second node N2 flows into the sensing line SL, which causes the first light-emitting element RLD to be short-circuited by the sensing line SL without emitting light. Alternatively, in this phase, the second scanning signal G2 may also not be loaded to the sensing transistor T5, or the initialization voltage Vinit may also not be loaded to the sensing line SL.

Referring to FIG. 6, in the second sub-phase t2 of the first phase P1 of this example, the third scanning signal G3 may be loaded to the third transistor T3, and the inactive level of the second control signal CKB may be loaded to the second control line CKBL, and then the voltage of the sixth node N6 is the inactive level of the second control signal CKB, which turns off the seventh transistor T7. It can be understood that in this phase, the third scanning signal G3 may also not be loaded to the third transistor T3, or the inactive level of the second control signal CKB may also not be loaded to the second control line CKBL. When the eighth transistor T8 is turned on, the second light-emitting element GLD is short-circuited without emitting light. Notably, maintaining the seventh transistor T7 off prevents the second light-emitting element GLD from emitting light under the driving of the leakage current, thereby reducing potential crosstalk.

Figure 7:
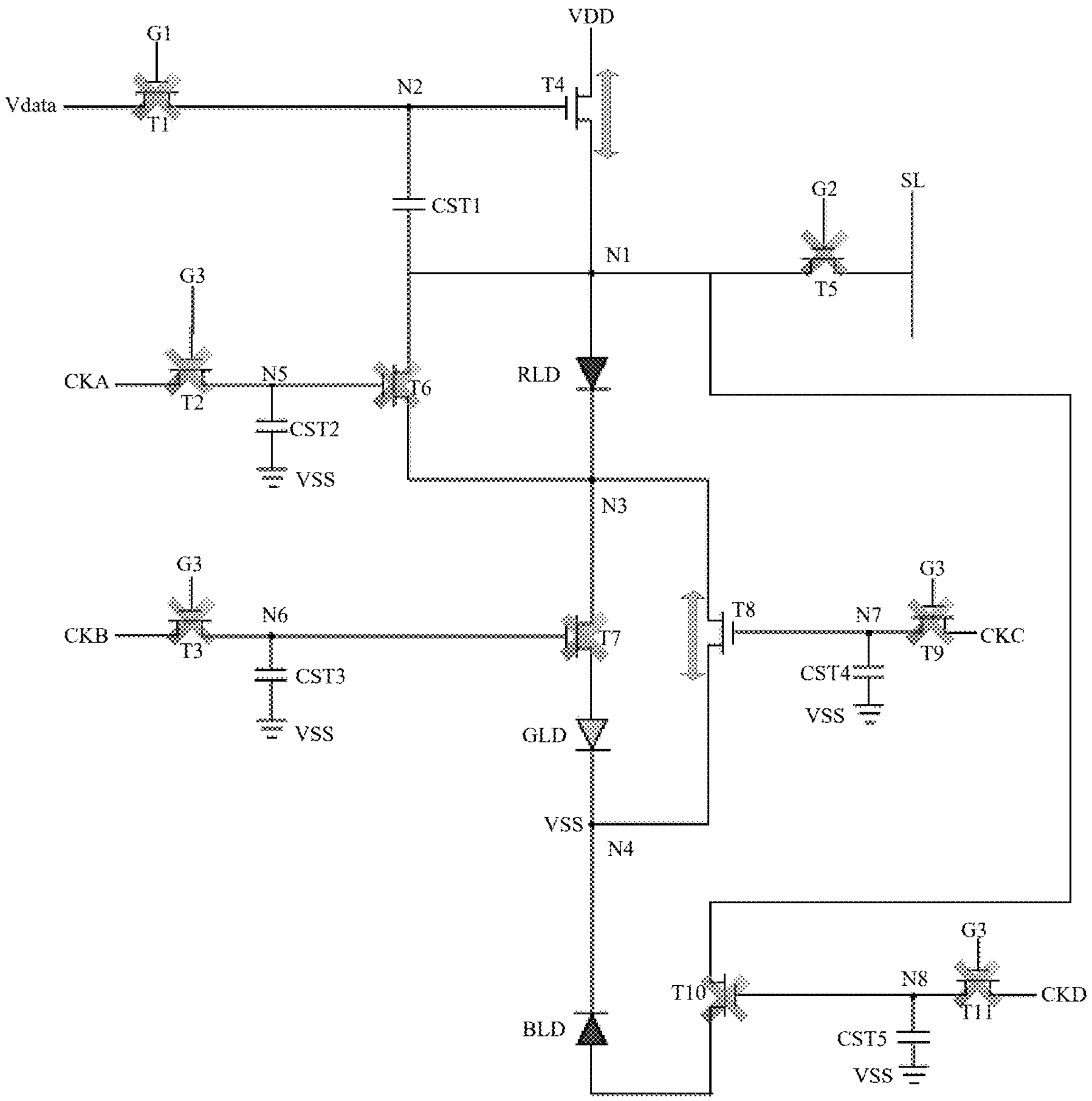
FIG. 7 is a schematic diagram of a state of a display unit in a third sub-phase of a first phase in an embodiment of the present disclosure.

In a third sub-phase t3 of the first phase P1, referring to FIGS. 6 and 7, the first scanning signal G1 is not loaded to the data writing transistor T1, thereby turning off the data writing transistor T1. For example, the inactive level of the first scanning signal G1 is loaded to the data writing transistor T1, thereby maintaining the data writing transistor T1 off. In this case, the voltage on the second node N2 is maintained as the data voltage Vdata of the first light-emitting element RLD.

The second scanning signal G2 is not loaded to the sensing transistor T5, so that the sensing transistor T5 is turned off. For example, the inactive level of the second scanning signal G2 is loaded to the sensing transistor T5, thereby maintaining the sensing transistor T5 off. The third scanning signal G3 is not loaded to the second transistor T2, the third transistor T3, the ninth transistor T9, and the eleventh transistor T11, so that the second transistor T2, the third transistor T3, the ninth transistor T9, and the eleventh transistor T11 are turned off. For example, the inactive level of the third scanning signal G3 is loaded to the second transistor T2, thereby maintaining the second transistor T2 off, the inactive level of the third scanning signal G3 is loaded to the third transistor T3, thereby maintaining the third transistor T3 off, the inactive level of the third scanning signal G3 is loaded to the ninth transistor T9, thereby maintaining the ninth transistor T9 off, and the inactive level of the third scanning signal G3 is loaded to the eleventh transistor T11, thereby maintaining the eleventh transistor T11 off. In this way, states of the sixth transistor T6, the seventh transistor T7, the eighth transistor T8 and the tenth transistor T10 are locked, which enables the driving current generated by the driving transistor T4 to flow through the first light emitting element RLD, thereby driving the first light emitting element RLD to emit light.

In a first sub-phase t4 of a second phase P2

The second scanning signal G2 (i.e., the active level of the second scanning signal G2) is loaded to the sensing transistor T5 and the initialization voltage Vinit is loaded to the sensing line SL. The voltage value of the initialization voltage Vinit is equal to the voltage value of the reference power supply voltage VSS. The sensing transistor T5 is turned on in response to the second scanning signal G2, and the voltage of the first node N1 is the initialization voltage Vinit, thereby resetting the first node N1 and the anode of the first light-emitting element RLD.

The third scanning signal G3 (i.e., the active level of the third scanning signal G3) is loaded to the second transistor T2, and the active level of the first control signal CKA is loaded to the first control line CKAL. The second transistor T2 is turned on in response to the third scanning signal G3, so that the voltage of the fifth node N5 is the active level of the first control signal CKA, which turns on the sixth transistor T6, thereby causing the voltage of the third node N3 to be the initialization voltage Vinit, so as to reset the third node N3.

The third scanning signal G3 (i.e., the active level of the third scanning signal G3) is loaded to the third transistor T3, and the active level of the second control signal CKB is loaded to the second control line CKBL. The third transistor T3 is turned on in response to the third scanning signal G3, so that the voltage of the sixth node N6 is the active level of the second control signal CKB, which turns on the seventh transistor T7, thereby causing the voltage of the anode of the second light-emitting element GLD to be the initialization voltage Vinit, so as to reset the anode of the second light-emitting element GLD.

The third scanning signal G3 (i.e., the active level of the third scanning signal G3) is loaded to the eleventh transistor T11, and the active level of the fourth control signal CKD is loaded to the fourth control line CKDL. The eleventh transistor T11 is turned on in response to the third scanning signal G3, so that the voltage of the eighth node N8 is the active level of the fourth control signal CKD, which turns on the tenth transistor T10, thereby causing the voltage of the anode of the third light-emitting element BLD to be the initialization voltage Vinit, so as to reset the anode of the third light-emitting element BLD.

Thus, in the first sub-phase t4 of the second phase P2, the anodes of the first light-emitting element RLD, the second light-emitting element GLD, and the third light-emitting element BLD can be reset.

Referring to FIG. 6, in the first sub-phase t4 of the second phase P2 of this example, the first scanning signal G1 (i.e., the active level of the first scanning signal G1) may also be loaded to the data writing transistor T1, and the data voltage Vdata of the second light-emitting element GLD may be loaded to the data line DL. The data writing transistor T1 is turned on in response to the first scanning signal G1, and the data voltage Vdata of the second light-emitting element GLD is written to the second node N2. It can be understood that the data voltage Vdata of the second light-emitting element GLD may also not be written to the second node N2 during this phase.

Referring to FIG. 6, in the first sub-phase t4 of the second phase P2 of this example, the third scanning signal G3 (i.e., the active level of the third scanning signal G3) may be loaded to the ninth transistor T9, and the active level of the third control signal CKC may be loaded to the third control line CKCL. The ninth transistor T9 is turned on in response to the third scanning signal G3, so that the voltage of the seventh node N7 is the active level of the third control signal CKC, thereby turning on the eighth transistor T8. It can be understood that, in this phase, the third scanning signal G3 may also not be loaded to the ninth transistor T9, or the active level of the third control signal CKC may also not be loaded to the third control line CKCL.

In a second sub-phase t5 of the second phase P2

The first scanning signal G1 (i.e., the active level of the first scanning signal G1) is loaded to the data writing transistor T1 and the data voltage Vdata of the second light-emitting element GLD is loaded to the data line DL. The data writing transistor T1 is turned on in response to the first scanning signal G1, and the data voltage Vdata of the second light-emitting element GLD is written to the second node N2.

The third scanning signal G3 (i.e., the active level of the third scanning signal G3) is loaded to the second transistor T2 and the active level of the first control signal CKA is loaded to the first control line CKAL. The voltage of the fifth node N5 is the active level of the first control signal CKA, which turns on the sixth transistor T6, thereby short-circuiting the first light-emitting element RLD.

The third scanning signal G3 is loaded to the third transistor T3 and the active level of the second control signal CKB is loaded to the second control line CKBL, and then the voltage of the sixth node N6 is the active level of the second control signal CKB, which turns on the seventh transistor T7.

The third scanning signal G3 (i.e., the active level of the third scanning signal G3) is loaded to the ninth transistor T9 and the inactive level of the third control signal CKC is loaded to the third control line CKCL. The voltage of the seventh node N7 is the inactive level of the third control signal CKC, which turns off the eighth transistor T8.

The third scanning signal G3 (i.e., the active level of the third scanning signal G3) is loaded to the eleventh transistor T11 and the inactive level of the fourth control signal CKD is loaded to the fourth control line CKDL. The voltage of the eighth node N8 is the inactive level of the fourth control signal CKD, which turns off the tenth transistor T10.

Thus, the sixth transistor T6 is turned on, the seventh transistor T7 is turned on, and the eighth transistor T8 is turned off, which causes the composite path module MA to be conductive. When a driving current flows through the composite path module MA, the driving current flows through the second light-emitting element GLD. The tenth transistor T10 is turned off to disconnect the third path module MB.

Referring to FIG. 6, in the second sub-phase t5 of the second phase P2 of this example, the initialization voltage Vinit may also be loaded to the sensing line SL, and the second scanning signal G2 may be loaded to the sensing transistor T5, so that the driving current output by the driving transistor T4 under the control of the voltage on the second node N2 flows into the sensing line SL, which causes the second light-emitting element GLD to be short-circuited by the sensing line SL without emitting light. Alternatively, in this phase, the second scanning signal G2 may also not be loaded to the sensing transistor T5, or the initialization voltage Vinit may also not be loaded to the sensing line SL.

Figure 8:
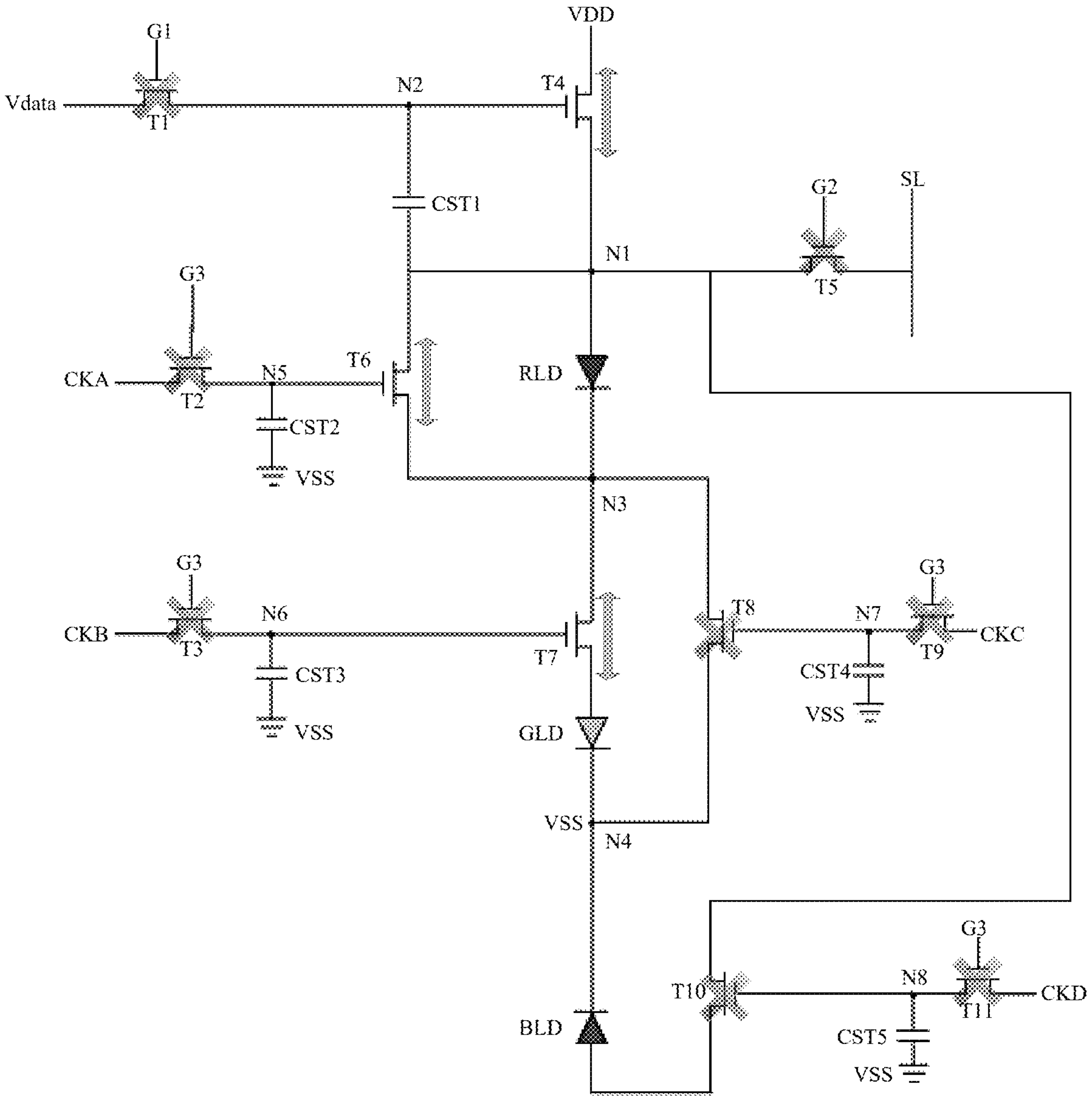
FIG. 8 is a schematic diagram of a state of a display unit in a third sub-phase of a second phase in an embodiment of the present disclosure.

In a third sub-phase t6 of the second phase P2, referring to FIGS. 6 and 8, the first scanning signal G1 is not loaded to the data writing transistor T1, thereby turning off the data writing transistor T1. For example, the inactive level of the first scanning signal G1 is loaded to the data writing transistor T1, thereby maintaining the data writing transistor T1 off. In this case, the voltage on the second node N2 is maintained as the data voltage Vdata of the second light-emitting element GLD.

The second scanning signal G2 is not loaded to the sensing transistor T5, so that the sensing transistor T5 is turned off. For example, the inactive level of the second scanning signal G2 is loaded to the sensing transistor T5, thereby maintaining the sensing transistor T5 off. The third scanning signal G3 is not loaded to the second transistor T2, the third transistor T3, the ninth transistor T9, and the eleventh transistor T11, so that the second transistor T2, the third transistor T3, the ninth transistor T9, and the eleventh transistor T11 are turned off. For example, the inactive level of the third scanning signal G3 is loaded to the second transistor T2, thereby maintaining the second transistor T2 off, the inactive level of the third scanning signal G3 is loaded to the third transistor T3, thereby maintaining the third transistor T3 off, the inactive level of the third scanning signal G3 is loaded to the ninth transistor T9, thereby maintaining the ninth transistor T9 off, and the inactive level of the third scanning signal G3 is loaded to the eleventh transistor T11, thereby maintaining the eleventh transistor T11 off. In this way, the states of the sixth transistor T6, the seventh transistor T7, the eighth transistor T8 and the tenth transistor T10 are locked, which enables the driving current generated by the driving transistor T4 to flow through the second light emitting element GLD, thereby driving the second light emitting element GLD to emit light.

In a first sub-phase t7 of the third phase P3

The second scanning signal G2 (i.e., the active level of the second scanning signal G2) is loaded to the sensing transistor T5 and the initialization voltage Vinit is loaded to the sensing line SL. The voltage value of the initialization voltage Vinit is equal to the voltage value of the reference power supply voltage VSS. The sensing transistor T5 is turned on in response to the second scanning signal G2, and the voltage of the first node N1 is the initialization voltage Vinit, thereby resetting the first node N1 and the anode of the first light-emitting element RLD.

The third scanning signal G3 (i.e., the active level of the third scanning signal G3) is loaded to the second transistor T2, and the active level of the first control signal CKA is loaded to the first control line CKAL. The second transistor T2 is turned on in response to the third scanning signal G3, so that the voltage of the fifth node N5 is the active level of the first control signal CKA, which turns on the sixth transistor T6, so as to reset the third node N3.

The third scanning signal G3 (i.e., the active level of the third scanning signal G3) is loaded to the third transistor T3, and the active level of the second control signal CKB is loaded to the second control line CKBL. The third transistor T3 is turned on in response to the third scanning signal G3, so that the voltage of the sixth node N6 is the active level of the second control signal CKB, which turns on the seventh transistor T7, thereby causing the voltage of the anode of the second light-emitting element GLD to be the initialization voltage Vinit, so as to reset the anode of the second light-emitting element GLD.

The third scanning signal G3 (i.e., the active level of the third scanning signal G3) is loaded to the eleventh transistor T11, and the active level of the fourth control signal CKD is loaded to the fourth control line CKDL. The eleventh transistor T11 is turned on in response to the third scanning signal G3, so that the voltage of the eighth node N8 is the active level of the fourth control signal CKD, which turns on the tenth transistor T10, thereby causing the voltage of the anode of the third light-emitting element BLD to be the initialization voltage Vinit, thereby resetting the anode of the third light-emitting element BLD.

Thus, in the first sub-phase t7 of the third phase P3, the anodes of the first light-emitting element RLD, the second light-emitting element GLD, and the third light-emitting element BLD can be reset.

Referring to FIG. 6, in the first sub-phase t7 of the third phase P3 of this example, the first scanning signal G1 (i.e., the active level of the first scanning signal G1) may also be loaded to the data writing transistor T1, and the data voltage Vdata of the third light-emitting element BLD is loaded to the data line DL. The data writing transistor T1 is turned on in response to the first scanning signal G1, and the data voltage Vdata of the third light-emitting element BLD is written to the second node N2. It can be understood that the data voltage Vdata of the third light-emitting element BLD may not be written to the second node N2 during this phase.

Referring to FIG. 6, in the first sub-phase t7 of the third phase P3 of this example, the third scanning signal G3 (i.e., the active level of the third scanning signal G3) may also be loaded to the ninth transistor T9, and the active level of the third control signal CKC may be loaded to the third control line CKCL. The ninth transistor T9 is turned on in response to the third scanning signal G3, so that the voltage of the seventh node N7 is the active level of the third control signal CKC, thereby turning on the eighth transistor T8. It can be understood that in this phase, the third scanning signal G3 may also not be loaded to the ninth transistor T9, or the active level of the third control signal CKC may also not be loaded to the third control line CKCL.

In a second sub-phase t8 of the third phase P3

The first scanning signal G1 (i.e., the active level of the first scanning signal G1) is loaded to the data writing transistor T1 and the data voltage Vdata of the third light-emitting element BLD is loaded to the data line DL. The data writing transistor T1 is turned on in response to the first scanning signal G1, and the data voltage Vdata of the third light-emitting element BLD is written to the second node N2.

The third scanning signal G3 is loaded to the third transistor T3 and the inactive level of the second control signal CKB is loaded to the second control line CKBL, and then the voltage of the sixth node N6 is the inactive level of the second control signal CKB, which turns off the seventh transistor T7.

The third scanning signal G3 (i.e., the active level of the third scanning signal G3) is loaded to the ninth transistor T9 and the inactive level of the third control signal CKC is loaded to the third control line CKCL. The voltage of the seventh node N7 is the inactive level of the third control signal CKC, which turns off the eighth transistor T8.

The third scanning signal G3 (i.e., the active level of the third scanning signal G3) is loaded to the eleventh transistor T11 and the active level of the fourth control signal CKD is loaded to the fourth control line CKDL. The voltage of the eighth node N8 is the active level of the fourth control signal CKD, which turns on the tenth transistor T10.

Thus, the seventh transistor T7 and the eighth transistor T8 are turned off, which causes the composite path module MA to be conductive, and the tenth transistor T10 is turned on, which causes the third path module MB to be conductive.

Referring to FIG. 6, in the second sub-phase t8 of the third phase P3 of this example, the third scanning signal G3 (i.e., the active level of the third scanning signal G3) may also be loaded to the second transistor T2, and the active level of the first control signal CKA may be loaded to the first control line CKAL. The voltage of the fifth node N5 is the active level of the first control signal CKA, which turns on the sixth transistor T6, thereby short-circuiting the first light-emitting element RLD. It can be understood that the third scanning signal G3 may also not be loaded to the second transistor T2, or the active level of the first control signal CKA may also not be loaded to the first control line CKAL. Regardless of whether the sixth transistor T6 is on or off, the composite path module MA is disconnected, preventing the first light-emitting element RLD from emitting light.

Referring to FIG. 6, in the second sub-phase t8 of the third phase P3 of this example, the initialization voltage Vinit may also be loaded to the sensing line SL, and the second scanning signal G2 may be loaded to the sensing transistor T5, so that the driving current output by the driving transistor T4 under the control of the second node N2 flows into the sensing line SL, which causes the third light-emitting element BLD to be short-circuited by the sensing line SL without emitting light. Alternatively, in this phase, the second scanning signal G2 may also not be loaded to the sensing transistor T5, or the initialization voltage Vinit may also not be loaded to the sensing line SL.

Figure 9:
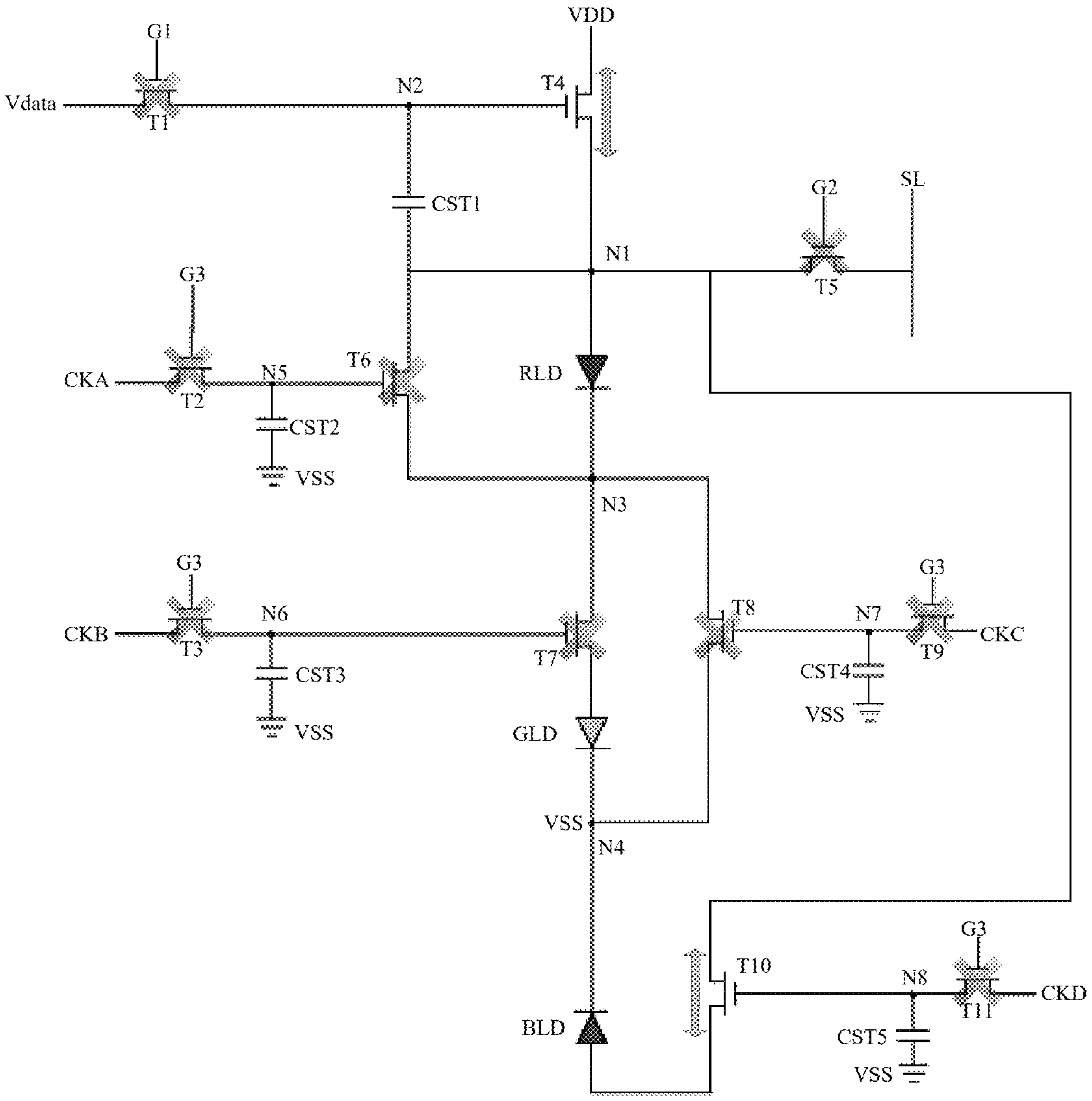
FIG. 9 is a schematic diagram of a state of a display unit in a third sub-phase of a third phase in an embodiment of the present disclosure.

In a third sub-phase t9 of the third phase P3, referring to FIGS. 6 and 9, the first scanning signal G1 is not loaded to the data writing transistor T1, thereby turning off the data writing transistor T1. For example, the inactive level of the first scanning signal G1 is loaded to the data writing transistor T1, thereby maintaining the data writing transistor T1 off. In this case, the voltage on the second node N2 is maintained as the data voltage Vdata of the third light-emitting element BLD.

The second scanning signal G2 is not loaded to the sensing transistor T5, so that the sensing transistor T5 is turned off. For example, the inactive level of the second scanning signal G2 is loaded to the sensing transistor T5, thereby maintaining the sensing transistor T5 off. The third scanning signal G3 is not loaded to the second transistor T2, the third transistor T3, the ninth transistor T9, and the eleventh transistor T11, so that the second transistor T2, the third transistor T3, the ninth transistor T9, and the eleventh transistor T11 are turned off. For example, the inactive level of the third scanning signal G3 is loaded to the second transistor T2, thereby maintaining the second transistor T2 off, the inactive level of the third scanning signal G3 is loaded to the third transistor T3, thereby maintaining the third transistor T3 off, the inactive level of the third scanning signal G3 is loaded to the ninth transistor T9, thereby maintaining the ninth transistor T9 off, and the inactive level of the third scanning signal G3 is loaded to the eleventh transistor T11, thereby maintaining the eleventh transistor T11 off. Thus, the states of the sixth transistor T6, the seventh transistor T7, the eighth transistor T8 and the tenth transistor T10 are locked, which enables the driving current generated by the driving transistor T4 to flow through the third light emitting element BLD, thereby driving the third light emitting element BLD to emit light.

Figure 10:
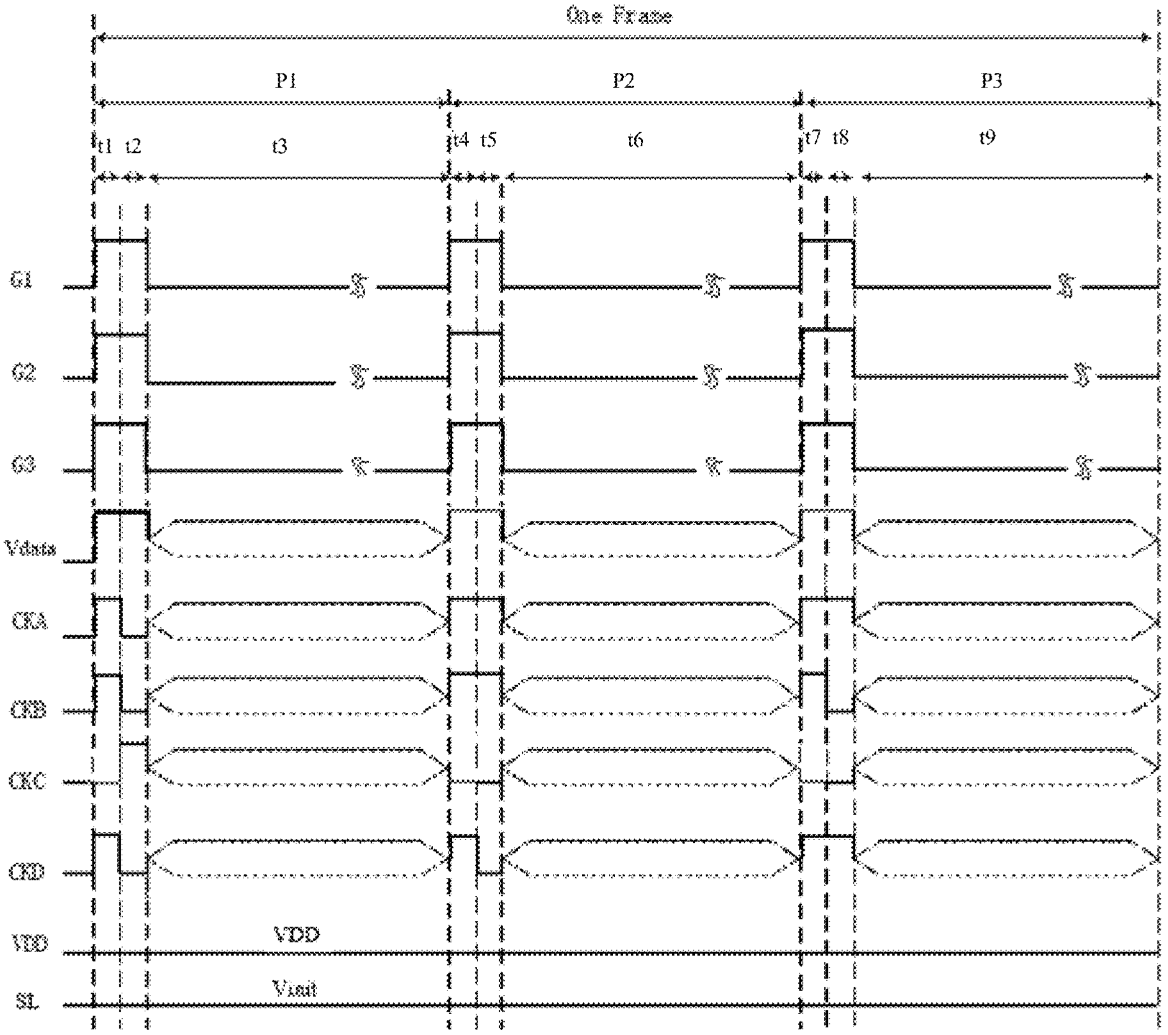
FIG. 10 is a schematic diagram of a driving timing sequence of a display unit in another embodiment of the present disclosure.

FIG. 10 shows another driving method for the example display unit UU. Referring to FIG. 10, the driving method differs from the driving method illustrated in FIG. 6 only in that:

- during the first sub-phase t1 of the first phase P1, the first sub-phase t4 of the second phase P2, and the first sub-phase t7 of the third phase P3, the third control line CKCL is loaded with the inactive level of the third control signal CKC, rather than the active level of the third control signal CKC. Thus, during the first sub-phase t1 of the first phase P1, the first sub-phase t4 of the second phase P2, and the first sub-phase t7 of the third phase P3, the eighth transistor T8 remains off, which still allows the anodes of individual light-emitting elements to be reset. In particular, when the voltage value of the initialization voltage Vinit differs from the voltage value of the reference power supply voltage VSS, the eighth transistor T8 remains off, which can isolate power sources of the initialization voltage Vinit and the reference power supply voltage VSS from each other.

Other embodiments of the present disclosure will be apparent to those skilled in the art from consideration of the specification and practice of the present disclosure disclosed herein. The present disclosure is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

What is claimed is:

1. A display unit, comprising:

a driving current module configured to output a driving current to a first node according to a data voltage;

a composite path module, comprising a first path module and a second path module connected in series, and a second control circuit, wherein a terminal of the composite path module is electrically connected to the first node, and the other terminal is configured to load a reference power supply voltage, the first path module comprises a first light-emitting element and a first control circuit connected in parallel with the first light-emitting element, the second path module comprises a second light-emitting element and a third control circuit connected in parallel with the second light-emitting element, and the second control circuit is configured to control whether the composite path module is electrically conductive; and a third path module, comprising a third light-emitting element and a fourth control circuit connected in series, wherein a terminal of the third path module is electrically connected to the first node, and the other terminal is configured to load the reference power supply voltage.

2. The display unit according to claim 1, wherein the driving current module comprises:

a driving transistor, wherein a first terminal of the driving transistor is configured to load a driving power supply voltage, a second terminal of the driving transistor is electrically connected to the first node, and a gate of the driving transistor is electrically connected to a second node, and the driving transistor is capable of outputting the driving current to the first node under control of a voltage on the second node;

a data writing unit, configured to write the data voltage to the second node in response to a first scanning signal;

a first capacitor, wherein a first terminal of the first capacitor is electrically connected to the second node, and a second terminal of the first capacitor is electrically connected to the first node; and a sensing unit, configured to load an initialization voltage to the first node in response to a second scanning signal.

3. The display unit according to claim 2, wherein the data writing unit comprises a data writing transistor, a first terminal of the data writing transistor is configured to load the data voltage, a second terminal of the data writing transistor is electrically connected to the second node, and a gate of the data writing transistor is configured to load the first scanning signal; and the sensing unit comprises a sensing transistor, a first terminal of the sensing transistor is configured to load the initialization voltage, a second terminal of the sensing transistor is electrically connected to the first node, and a gate of the sensing transistor is configured to load the second scanning signal.

4. The display unit according to claim 1, wherein the first control circuit comprises a sixth transistor and a first control sub-circuit;

a first terminal of the sixth transistor is connected to an anode of the first light-emitting element, a second terminal of the sixth transistor is connected to a cathode of the first light-emitting element, and a gate of the sixth transistor is electrically connected to a fifth node and is configured to be turned on or off under control of a voltage on the fifth node; and the first control sub-circuit is configured to control the voltage on the fifth node.

5. The display unit according to claim 4, wherein the first control sub-circuit comprises a second transistor and a second capacitor, a first terminal of the second transistor is configured to load a first control signal, a second terminal of the second transistor and a first terminal of the second capacitor are electrically connected to the fifth node, a gate of the second transistor is configured to load a third scanning signal, and a second terminal of the second capacitor is configured to load the reference power supply voltage.

6. The display unit according to claim 1, wherein the third control circuit comprises an eighth transistor and a third control sub-circuit;

a second terminal of the eighth transistor is electrically connected to a cathode of the second light-emitting element, a first terminal of the eighth transistor is electrically connected to an anode of the second light-emitting element, or the first terminal of the eighth transistor is electrically connected to the anode of the second light-emitting element via the second control circuit, and a gate of the eighth transistor is electrically connected to a seventh node and is configured to be turned on or off under control of a voltage on the seventh node; and the third control sub-circuit is configured to control the voltage on the seventh node.

7. The display unit according to claim 6, wherein the third control sub-circuit comprises a ninth transistor and a fourth capacitor, a first terminal of the ninth transistor is configured to load a third control signal, a second terminal of the ninth transistor and a first terminal of the fourth capacitor are electrically connected to the seventh node, and a gate of the ninth transistor is configured to load a third scanning signal, and a second terminal of the fourth capacitor is configured to load the reference power supply voltage.

8. The display unit according to claim 1, wherein the second control circuit comprises a seventh transistor and a second control sub-circuit, the seventh transistor is arranged in series with the first light-emitting element and in parallel with the first control circuit, or the seventh transistor is arranged in series with the first path module and the second path module, or the seventh transistor is arranged in series with the second light-emitting element and in parallel with the third control circuit;

a gate of the seventh transistor is electrically connected to a sixth node and is configured to be turned on or off under control of a voltage on the sixth node; and the second control sub-circuit is configured to control the voltage on the sixth node.

9. The display unit according to claim 8, wherein the second control sub-circuit comprises a third transistor and a third capacitor, a first terminal of the third transistor is configured to load a second control signal, a second terminal of the third transistor and a first terminal of the third capacitor are electrically connected to the sixth node, and a gate of the third transistor is configured to load a third scanning signal, and a second terminal of the third capacitor is configured to load the reference power supply voltage.

10. The display unit according to claim 8, wherein an anode of the first light-emitting element and a terminal of the first control circuit are electrically connected to the first node, and a cathode of the first light-emitting element and the other terminal of the first control circuit are electrically connected to a third node; and a cathode of the second light-emitting element and a terminal of the third control circuit are configured to load the reference power supply voltage, an anode of the second light-emitting element is electrically connected to a second terminal of the seventh transistor, and a first terminal of the seventh transistor and the other terminal of the third control circuit are electrically connected to the third node.

11. The display unit according to claim 1, wherein the fourth control circuit comprises a tenth transistor and a fourth control sub-circuit, a first terminal of the tenth transistor is electrically connected to the first node, a second terminal of the tenth transistor is electrically connected to an anode of the third light-emitting element, and a cathode of the third light-emitting element is configured to load the reference power supply voltage;

a gate of the tenth transistor is electrically connected to an eighth node and is configured to be turned on or off under control of a voltage on the eighth node; and the fourth control sub-circuit is configured to control the voltage on the eighth node.

12. The display unit according to claim 11, wherein the fourth control sub-circuit comprises an eleventh transistor and a fifth capacitor, a first terminal of the eleventh transistor is configured to load a fourth control signal, a second terminal of the eleventh transistor and a first terminal of the fifth capacitor are electrically connected to the eighth node, and a gate of the eleventh transistor is configured to load a third scanning signal, and a second terminal of the fifth capacitor is configured to load the reference power supply voltage.

13. The display unit according to claim 1, wherein the driving current module comprises a data writing transistor, a driving transistor, a sensing transistor, and a first capacitor, the data writing transistor is configured to load the data voltage to a second node in response to a first scanning signal, and the sensing transistor is configured to load an initialization voltage to the first node in response to a second scanning signal, a first terminal of the first capacitor is electrically connected to the second node, and a second terminal of the first capacitor is electrically connected to the first node, a first terminal of the driving transistor is configured to load a driving power supply voltage, a gate of the driving transistor is electrically connected to the second node, and a second terminal of the driving transistor is electrically connected to the first node, and the driving transistor is configured to output the driving current to the first node under control of a voltage on the second node;

the first control circuit comprises a sixth transistor, a second transistor, and a second capacitor, a first terminal of the sixth transistor and an anode of the first light-emitting element are electrically connected to the first node, a second terminal of the sixth transistor and a cathode of the first light-emitting element are electrically connected to a third node, a gate of the sixth transistor, a second terminal of the second transistor, and a first terminal of the second capacitor are electrically connected to a fifth node, the second transistor is configured to load a first control signal to the fifth node in response to a third scanning signal, and a second terminal of the second capacitor is configured to load the reference power supply voltage;

the second control circuit comprises a seventh transistor, a third transistor, and a third capacitor, a first terminal of the seventh transistor is electrically connected to the third node, a second terminal of the seventh transistor is electrically connected to an anode of the second light-emitting element, a gate of the seventh transistor, a second terminal of the third transistor, and a first terminal of the third capacitor are electrically connected to a sixth node, the third transistor is configured to load a second control signal to the sixth node in response to the third scanning signal, and a second terminal of the third capacitor is configured to load the reference power supply voltage;

the third control circuit comprises an eighth transistor, a ninth transistor, and a fourth capacitor, a first terminal of the eighth transistor is electrically connected to the third node, a second terminal of the eighth transistor and a cathode of the second light-emitting element are configured to load the reference power supply voltage, a gate of the eighth transistor, a second terminal of the ninth transistor, and a first terminal of the fourth capacitor are electrically connected to a seventh node, the ninth transistor is configured to load a third control signal to the seventh node in response to the third scanning signal, and a second terminal of the fourth capacitor is configured to load the reference power supply voltage; and the fourth control circuit comprises a tenth transistor, an eleventh transistor and a fifth capacitor, a first terminal of the tenth transistor is electrically connected to the first node, a second terminal of the tenth transistor is electrically connected to an anode of the third light-emitting element, a gate of the tenth transistor, a second terminal of the eleventh transistor and a first terminal of the fifth capacitor are electrically connected to an eighth node, the eleventh transistor is configured to load a fourth control signal to the eighth node in response to the third scanning signal, and a second terminal of the fifth capacitor is configured to load the reference power supply voltage.

14. The display unit according to claim 1, wherein the first light emitting element, the second light emitting element and the third light emitting element are stacked on each other.

15. A display panel comprising a display unit, wherein the display unit comprises:

a driving current module configured to output a driving current to a first node according to a data voltage;

a composite path module, comprising a first path module and a second path module connected in series, and a second control circuit, wherein a terminal of the composite path module is electrically connected to the first node, and the other terminal is configured to load a reference power supply voltage, the first path module comprises a first light-emitting element and a first control circuit connected in parallel with the first light-emitting element, the second path module comprises a second light-emitting element and a third control circuit connected in parallel with the second light-emitting element, and the second control circuit is configured to control whether the composite path module is electrically conductive; and a third path module, comprising a third light-emitting element and a fourth control circuit connected in series, wherein a terminal of the third path module is electrically connected to the first node, and the other terminal is configured to load the reference power supply voltage.

16. A driving method for a display unit, applied to a display unit, wherein the display unit comprises:

a driving current module configured to output a driving current to a first node according to a data voltage;

a composite path module, comprising a first path module and a second path module connected in series, and a second control circuit, wherein a terminal of the composite path module is electrically connected to the first node, and the other terminal is configured to load a reference power supply voltage, the first path module comprises a first light-emitting element and a first control circuit connected in parallel with the first light-emitting element, the second path module comprises a second light-emitting element and a third control circuit connected in parallel with the second light-emitting element, and the second control circuit is configured to control whether the composite path module is electrically conductive; and a third path module, comprising a third light-emitting element and a fourth control circuit connected in series, wherein a terminal of the third path module is electrically connected to the first node, and the other terminal is configured to load the reference power supply voltage;

wherein the driving method comprises:

in a first phase, writing a data voltage of the first light-emitting element to the driving current module to make the composite path module electrically conductive and make the first control circuit disconnected, the third control circuit electrically conductive, and the fourth control circuit disconnected;

in a second phase, writing a data voltage of the second light-emitting element to the driving current module to make the composite path module electrically conductive, and make the third control circuit disconnected, the first control circuit electrically conductive, and the fourth control circuit disconnected; and in a third phase, writing a data voltage of the third light-emitting element to the driving current module to make the composite path module disconnected and make the fourth control circuit electrically conductive.

17. A driving method for a display unit, applied to the display unit according to claim 13, wherein the driving method comprises:

in a first sub-phase of a first phase, loading the second scanning signal and the initialization voltage to the sensing transistor, loading the third scanning signal and an active level of the first control signal to the second transistor to turn on the sixth transistor, loading the third scanning signal and an active level of the second control signal to the third transistor to turn on the seventh transistor, and loading the third scanning signal and an active level of fourth control signal to the eleventh transistor to turn on the tenth transistor;

in a second sub-phase of the first phase, loading the first scanning signal and a data voltage of the first light-emitting element to the data writing transistor to write the data voltage of the first light-emitting element to the second node, loading the third scanning signal and an inactive level of the first control signal to the second transistor to turn off the sixth transistor, loading the third scanning signal and an active level of the third control signal to the ninth transistor to turn on the eighth transistor, and loading the third scanning signal and an inactive level of the fourth control signal to the eleventh transistor to turn off the tenth transistor;

in a third sub-phase of the first phase, not loading the first scanning signal to the data writing transistor to turn off the data writing transistor, not loading the second scanning signal to the sensing transistor to turn off the sensing transistor, and not loading the third scanning signal to the second transistor, the third transistor, the ninth transistor, and the eleventh transistor to turn off the second transistor, the third transistor, the ninth transistor, and the eleventh transistor;

in a first sub-phase of a second phase, loading the second scanning signal and the initialization voltage to the sensing transistor, loading the third scanning signal and the active level of the first control signal to the second transistor to turn on the sixth transistor, loading the third scanning signal and the active level of the second control signal to the third transistor to turn on the seventh transistor, and loading the third scanning signal and the active level of the fourth control signal to the eleventh transistor to turn on the tenth transistor;

in a second sub-phase of the second phase, loading the first scanning signal and a data voltage of the second light-emitting to the data writing transistor to write the data voltage of the second light-emitting element to the second node, loading the third scanning signal and the active level of the first control signal to the second transistor to turn on the sixth transistor, loading the third scanning signal and the active level of the second control signal to the third transistor to turn on the seventh transistor, loading the third scanning signal and an inactive level of the third control signal to the ninth transistor to turn off the eighth transistor, and loading the third scanning signal and the inactive level of the fourth control signal to the eleventh transistor to turn off the tenth transistor;

in a third sub-phase of the second phase, not loading the first scanning signal to the data writing transistor to turn off the data writing transistor, not loading the second scanning signal to the sensing transistor to turn off the sensing transistor, and not loading the third scanning signal to the second transistor, the third transistor, the ninth transistor, and the eleventh transistor to turn off the second transistor, the third transistor, the ninth transistor, and the eleventh transistor;

in a first sub-phase of a third phase, loading the second scanning signal and the initialization voltage to the sensing transistor, loading the third scanning signal and the active level of the first control signal to turn on the sixth transistor, loading the third scanning signal and the active level of the second control signal to the third transistor to turn on the seventh transistor, and loading the third scanning signal and the active level of the fourth control signal to the eleventh transistor to turn on the tenth transistor;

in a second sub-phase of the third phase, loading the first scanning signal and a data voltage of the third light-emitting element to the data writing transistor to write the data voltage of the third light-emitting element to the second node, loading the third scanning signal and an inactive level of the second control signal to the third transistor to turn off the seventh transistor, loading the third scanning signal and the inactive level of the third control signal to the ninth transistor to turn off the eighth transistor, and loading the third scanning signal and the active level of the fourth control signal to the eleventh transistor to turn on the tenth transistor; and in a third sub-phase of the third phase, not loading the first scanning signal to the data writing transistor to turn off the data writing transistor, not loading the second scanning signal to the sensing transistor to turn off the sensing transistor, and not loading the third scanning signal to the second transistor, the third transistor, the ninth transistor and the eleventh transistor to turn off the second transistor, the third transistor, the ninth transistor and the eleventh transistor.

* * * * *